United States Patent
Kiyoto et al.

(10) Patent No.: US 10,408,980 B2
(45) Date of Patent: Sep. 10, 2019

(54) HEAT INSULATING WINDOW FILM, HEAT INSULATING WINDOW GLASS, BUILDING MATERIAL, WINDOW, BUILDING, AND VEHICLE

(71) Applicant: FUJIFILM Corporation, Tokyo (JP)

(72) Inventors: Naoharu Kiyoto, Fujinomiya (JP); Kentaro Okazaki, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 288 days.

(21) Appl. No.: 15/344,826

(22) Filed: Nov. 7, 2016

(65) Prior Publication Data

US 2017/0052296 A1 Feb. 23, 2017

Related U.S. Application Data

(63) Continuation of application No. PCT/JP2015/063166, filed on May 7, 2015.

(30) Foreign Application Priority Data

May 8, 2014 (JP) .................................. 2014-096847
Apr. 24, 2015 (JP) .................................. 2015-089017

(51) Int. Cl.
*G02B 5/20* (2006.01)
*B32B 27/18* (2006.01)
(Continued)

(52) U.S. Cl.
CPC ............... *G02B 5/208* (2013.01); *B32B 7/12* (2013.01); *B32B 15/18* (2013.01); *B32B 15/20* (2013.01);
(Continued)

(58) Field of Classification Search
CPC .......... G02B 5/208; G02B 1/04; G02B 5/282; G02B 5/223; G02B 5/26; G02B 5/0891;
(Continued)

(56) References Cited

U.S. PATENT DOCUMENTS

2003/0099842 A1* 5/2003 Za-Gdoun ......... B32B 17/10036
428/432
2008/0280078 A1* 11/2008 Krisko .................... B32B 17/06
428/34

(Continued)

FOREIGN PATENT DOCUMENTS

JP 2012-215825 A * 11/2012

OTHER PUBLICATIONS

International Preliminary Report on Patentability and Written Opinion of the International Searching Authority (Forms PCT/IB/338, PCT/IB/373 andPCT/ISA/237), dated Nov. 17, 2016, for International Application No. PCT/JP2015/063166, including an English translation.

(Continued)

*Primary Examiner* — Evan P Dzierzynski
*Assistant Examiner* — Sharrief I Broome
(74) *Attorney, Agent, or Firm* — Birch, Stewart, Kolasch & Birch, LLP

(57) ABSTRACT

There is provided a heat insulating window film disposed on the inside of a window, including at least: a support; and a fibrous conductive particles-containing layer disposed on the support, in which the fibrous conductive particles-containing layer is disposed on a surface of the support on a side opposite to the surface of the window side, and the heat insulating window film contains a near infrared shielding material. The heat insulating window film; a heat insulating window glass; an building material; a window; a building; and a vehicle which are manufactured at low cost, easily manufactured to have a large area, and have excellent visible light transmittance, shielding properties for near infrared light, heat insulating properties, and light resistance are provided.

15 Claims, 4 Drawing Sheets

(51) Int. Cl.
| | |
|---|---|
| G02B 5/26 | (2006.01) |
| B32B 7/12 | (2006.01) |
| B32B 17/10 | (2006.01) |
| B32B 27/36 | (2006.01) |
| C03C 17/00 | (2006.01) |
| C03C 17/32 | (2006.01) |
| C09D 5/24 | (2006.01) |
| C09D 5/32 | (2006.01) |
| E06B 5/10 | (2006.01) |
| C09D 7/40 | (2018.01) |
| B32B 15/18 | (2006.01) |
| B32B 15/20 | (2006.01) |
| B32B 27/16 | (2006.01) |
| B32B 27/28 | (2006.01) |
| B32B 27/30 | (2006.01) |
| B32B 27/34 | (2006.01) |
| E06B 3/70 | (2006.01) |

(52) U.S. Cl.
CPC ........ *B32B 17/10779* (2013.01); *B32B 27/16* (2013.01); *B32B 27/18* (2013.01); *B32B 27/281* (2013.01); *B32B 27/286* (2013.01); *B32B 27/304* (2013.01); *B32B 27/34* (2013.01); *B32B 27/36* (2013.01); *B32B 27/365* (2013.01); *C03C 17/007* (2013.01); *C03C 17/322* (2013.01); *C09D 5/24* (2013.01); *C09D 5/32* (2013.01); *C09D 7/70* (2018.01); *E06B 3/70* (2013.01); *E06B 5/10* (2013.01); *G02B 5/26* (2013.01); *B32B 2250/02* (2013.01); *B32B 2255/06* (2013.01); *B32B 2255/10* (2013.01); *B32B 2255/20* (2013.01); *B32B 2255/26* (2013.01); *B32B 2255/28* (2013.01); *B32B 2307/202* (2013.01); *B32B 2307/304* (2013.01); *B32B 2307/40* (2013.01); *B32B 2307/41* (2013.01); *B32B 2307/412* (2013.01); *B32B 2307/416* (2013.01); *B32B 2307/50* (2013.01); *B32B 2307/546* (2013.01); *B32B 2307/554* (2013.01); *B32B 2307/71* (2013.01); *B32B 2307/712* (2013.01); *B32B 2307/732* (2013.01); *B32B 2410/00* (2013.01); *B32B 2419/00* (2013.01); *B32B 2605/006* (2013.01); *B32B 2605/08* (2013.01); *C03C 2217/29* (2013.01)

(58) Field of Classification Search
CPC ........ G02B 5/0816; G02B 1/14; G02B 5/283; G02B 5/281; G02B 5/22; G02B 5/201; G02B 5/285; G02B 1/10; G02B 1/11; G02B 5/206; G02B 5/0841; G02B 5/287; G02B 5/0242; G02B 5/08; B32B 7/02; B32B 27/08; B32B 17/10; B32B 2307/412; B32B 2307/416; B32B 2367/00; B32B 2419/00; B32B 27/20; B32B 2264/102; B32B 2307/418; B32B 27/306; B32B 17/10036; B32B 2307/4026; B32B 2551/00; B32B 27/18; B32B 17/10633; B32B 17/10761; B32B 2307/42; B32B 2307/712; B32B 2605/00
See application file for complete search history.

(56) References Cited

U.S. PATENT DOCUMENTS

2013/0071651 A1* 3/2013 Hakuta ............... B32B 17/1044
  428/333
2014/0203223 A1* 7/2014 Ikada .................... B32B 15/08
  252/514

OTHER PUBLICATIONS

International Search Report (PCT/ISA/210) issued in PCT/JP2015/063166, dated Aug. 11, 2015.
Macleod, H. A., "Thin-Film Optical Filters", The Nikkan Kogyo Shimbun, 1989, pp. 599-602.
Written Opinion (PCT/ISA/237) issued in PCT/JP2015/063166, dated Aug. 11, 2015.

* cited by examiner

HEAT INSULATING WINDOW FILM, HEAT INSULATING WINDOW GLASS, BUILDING MATERIAL, WINDOW, BUILDING, AND VEHICLE

CROSS-REFERENCE TO RELATED APPLICATIONS

This application is a Continuation of PCT International Application No. PCT/JP2015/063166, filed on May 7, 2015, which claims priority under 35 U.S.C. Section 119(a) to Japanese Patent Application No. 2014-096847 filed on May 8, 2014 and Japanese Patent Application No. 2015-089017 filed on Apr. 24, 2015. Each of the above applications is hereby expressly incorporated by reference, in its entirety, into the present application.

BACKGROUND OF THE INVENTION

1. Field of the Invention

The present invention relates to a heat insulating window film, a heat insulating window glass, a building material, a window, a building, and a vehicle. More specifically, the invention relates to a heat insulating window film, a heat insulating window glass, an building material, a window, a building, and a vehicle which are manufactured at low cost, easily manufactured to have a large area, and have excellent visible light transmittance, shielding properties for near infrared light, heat insulating properties, and light resistance.

2. Description of the Related Art

In recent years, products with a lower environmental burden, which are so-called eco-friendly products have been required as one of energy saving measures for carbon dioxide reduction, and solar control window films for windows of vehicles or buildings have been required. A heat insulating window film is considered as such a product. The heat insulating window film is a film which delays transmission and reception of heat between an indoor side and an outdoor side by being attached to windows, and usage of heating and cooling is reduced by using this film, and therefore, energy saving can be expected. A degree of heat insulation is defined by using a coefficient of overall heat transmission. In the solar control window film procurement standard in the Law Concerning the Promotion of Procurement of Eco-Friendly Goods and Services by the State and Other Entities (so-called Green Purchasing Law), heat insulating properties are determined to be obtained when a coefficient of overall heat transmission is less than 5.9 $W/(m^2 \cdot K)$ measured by using a measurement method based on JIS A 5759 "Adhesive films for glazing" (JIS stands for Japanese Industrial Standards). When the numerical value thereof is small, the transmission of heat is delayed and heat insulating properties are increased. According to JIS A 5759, a coefficient of overall heat transmission can be acquired from reflection spectra of far infrared rays at a wavelength of 5 μm to 50 μm. That is, it is preferable to increase reflectivity of far infrared rays at a wavelength of 5 μm to 50 μm, in order to decrease a coefficient of overall heat transmission.

In the solar control window film procurement standard in the Green Purchasing Law, it is necessary to decrease a shade factor, in order to increase a quantity of heat flow for sunlight. As a method of decreasing a shade factor, a method of using a near infrared shielding material capable of increasing shielding properties of near infrared light is used.

H. A. Macleod. Thin-Film Optical Filters, The Nikkan Kogyo Shimbun, 1989, p 599-602 discloses that a layer reflecting infrared rays can be prepared by interposing a metal layer between two dielectric layers, as the method of increasing the reflectivity of infrared rays.

SUMMARY OF THE INVENTION

The layer reflecting infrared rays obtained by interposing a metal layer between two dielectric layers disclosed in H. A. Macleod. Thin-Film Optical Filters, The Nikkan Kogyo Shimbun, 1989, p 599-602 can be manufactured by sputtering. However, manufacturing costs are high for a sputtering-metal laminate manufactured by sputtering. In addition, in a case of using the sputtering-metal laminate for windows, it is necessary to provide a sputtering-metal laminate having a large area. When considering the layer on the premise that the layer is manufactured by a sputtering method, it is difficult to manufacture the layer reflecting infrared rays obtained by interposing a metal layer between two dielectric layers such that it has a large area.

Further, in a case where the usage of a heat insulating window film for windows of vehicles or buildings is considered, high visible light transmittance (also referred to as high transparency) is preferable. When the inventors investigated the properties thereof, it was found that it was difficult to manufacture a layer reflecting infrared rays obtained by interposing a metal layer between two dielectric layers such that it had high transparency.

Meanwhile, fibrous conductive particles (for example, silver nanowires) are known as a material of a transparent conductive pattern in the touch panel field. A coating method or the like can be selected as a manufacturing method of a far infrared shielding material using a fibrous conductive particles-containing layer, and a material having high transparency can be prepared at low cost. When the inventors investigated properties of a layer prepared by using fibrous conductive particles, a layer having far infrared shielding properties, and high visible light transmittance which was unknown in the related art was newly found.

However, when the inventors further investigated the properties of the layer using fibrous conductive particles, a new problem regarding poor light resistance and heat insulating properties which was unknown in the related art, when using the fibrous conductive particles-containing layer as a material of a heat insulating window film was newly found. In the solar control window film procurement standard in the Green Purchasing Law, light resistance is important, and it is preferable that it is difficult for a material to deteriorate by becoming brittle due to sunlight and the performance thereof hardly deteriorates due to sunlight.

An object of the invention is to provide a heat insulating window film which is manufactured at low cost, easily manufactured to have a large area, and has excellent visible light transmittance, shielding properties for near infrared light, heat insulating properties, and light resistance.

As a result of intensive studies, the inventors have newly found that light resistance is not deteriorated even when a fibrous conductive particles-containing layer is used as a heat insulating window film, due to combining the fibrous conductive particles-containing layer having excellent heat insulating properties with a near infrared shielding material having excellent shielding properties for near infrared light, which is an unexpected synergistic effect.

As a result, the inventors have found that it is possible to provide a heat insulating window film which is manufactured at low cost, easily manufactured to have a large area, and has excellent visible light transmittance, shielding properties for near infrared light, heat insulating properties, and light resistance, by disposing the fibrous conductive particles-containing layer on a surface of a support on a side opposite to a window side surface and combining the layer with a near infrared shielding material having excellent shielding properties for near infrared light.

That is, the above-mentioned problems are solved with the invention having the following configurations.

[1] A heat insulating window film disposed on the inside of a window, comprising at least: a support; and a fibrous conductive particles-containing layer disposed on the support, in which the fibrous conductive particles-containing layer is disposed on a surface of the support on a side opposite to the surface of the window side, and the heat insulating window film contains a near infrared shielding material.

[2] The heat insulating window film according to [1], in which a content per unit area of the fibrous conductive particles of the fibrous conductive particles-containing layer is from 0.02 to 0.2 g/m$^2$.

[3] The heat insulating window film according to [1] or [2], in which an average long axis length of the fibrous conductive particles contained in the fibrous conductive particles-containing layer is from 5 to 50 μm.

[4] The heat insulating window film according to any one of [1] to [3], in which a distance between the fibrous conductive particles-containing layer of the heat insulating window film and an outermost surface on the indoor side is within 1 μm.

[5] The heat insulating window film according to any one of [1] to [4], in which the fibrous conductive particles-containing layer of the heat insulating window film is the outermost surface or the second outermost layer on the indoor side.

[6] The heat insulating window film according to any one of [1] to [5], in which visible light transmittance in a case where the heat insulating window film is bonded to a blue plate glass having a thickness of 3 mm is equal to or greater than 80%.

[7] The heat insulating window film according to any one of [1] to [6], in which the fibrous conductive particles-containing layer further contains a sol-gel hardened material obtained by hydrolysis and polycondensation of an alkoxide compound of an element (b) selected from the group consisting of Si, Ti, Zr, and Al.

[8] The heat insulating window film according to [7], in which a ratio of the mass of the alkoxide compound used for forming the sol-gel hardened material in the fibrous conductive particles-containing layer to the mass of fibrous conductive particles contained in the fibrous conductive particles-containing layer is from 0.25/1 to 30/1.

[9] A heat insulating window glass in which the heat insulating window film according to any one of [1] to [8] and a glass are laminated.

[10] A building material comprising: the heat insulating window film according to any one of [1] to [8] or the heat insulating window glass according to [9].

[11] A window comprising: a transparent window support; and the heat insulating window film according to any one of [1] to [8] bonded to the transparent window support.

[12] A building comprising: the heat insulating window film according to any one of [1] to [8]; the heat insulating window glass according to [9]; the building material according to [10] or the window according to [11].

[13] A vehicle comprising: the heat insulating window film according to any one of [1] to [8]; the heat insulating window glass according to [9] or the window according to [11].

According to the invention, it is possible to provide a heat insulating window film which is manufactured at low cost, easily manufactured to have a large area, and has excellent visible light transmittance, shielding properties for near infrared light, heat insulating properties, and light resistance.

DESCRIPTION OF THE PREFERRED EMBODIMENTS

Figure 1:
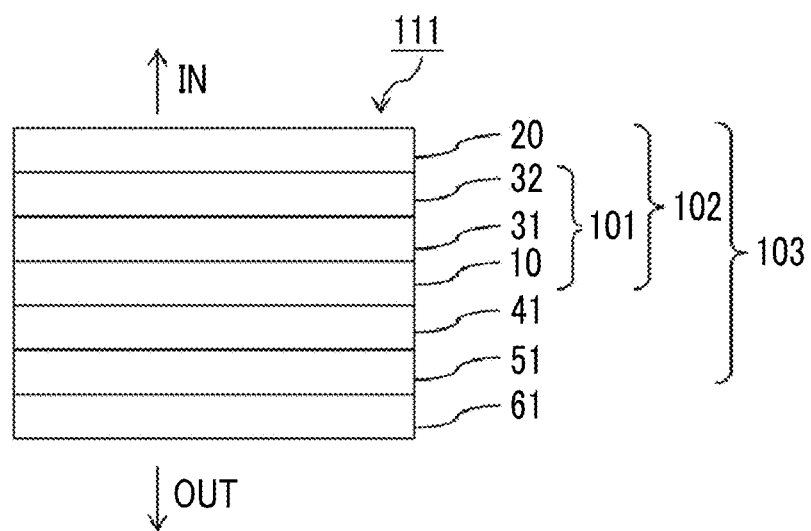
FIG. 1 is a schematic view showing a cross section of an example of a heat insulating window glass of the invention.

Hereinafter, the invention will be described in detail. The description of the following constituent elements is based on representative embodiments and specific examples, but the invention is not limited to such embodiments. In this specification, a number range expressed using "to" means a range including the numerical numbers before and after the term "to" as a lower limit value and an upper limit value.

[Heat Insulating Window Film]

A heat insulating window film of the invention is a heat insulating window film disposed on the inner side of the window. The heat insulating window film at least includes a support, and a fibrous conductive particles-containing layer disposed on the support, the fibrous conductive particles-containing layer is disposed on a surface of the support on a side opposite to a window side surface, and the heat insulating window film includes near infrared shielding material.

With such a configuration, it is possible to provide a heat insulating window film which is manufactured at low cost, easily manufactured to have a large area, and has excellent visible light transmittance, shielding properties for near infrared light, heat insulating properties, and light resistance. The heat insulating window film having such a configuration can be manufactured particularly by applying the fibrous conductive particles-containing layer, and accordingly, the manufacturing cost thereof is low and an area of the film is easily enlarged, compared to a sputtering-metal laminate. In addition, the fibrous conductive particles-containing layer has higher visible light transmittance, compared to a sputtering-metal laminate.

When the fibrous conductive particles-containing layer is disposed on a surface of the support on a side opposite to a window side surface (preferably, the fibrous conductive particles-containing layer is used as the outermost layer on the outdoor side as possible), it is possible to reflect far infrared rays. When the heat insulating window film is not provided, far infrared rays in a room are adsorbed onto glass and the indoor heat escapes to the outside of the room due to heat conduction in the glass, but when the heat insulating window film is provided, far infrared rays are reflected in the room, and accordingly, the indoor heat hardly escapes to the outside of the room.

In addition, by using the near infrared shielding material, shielding properties for near infrared light can be increased, and light resistance thereof are also improved, by using the near infrared shielding material in the fibrous conductive particles-containing layer in combination. A mechanism of improving light resistance is not bound to any theory, but it is considered that, the sunlight contains large quantity of near infrared rays and the fibrous conductive particles absorb the near infrared rays to be deteriorated, but this phenomenon is excellently prevented by the near infrared shielding material.

Hereinafter, a preferred embodiment of the heat insulating window film of the invention will be described.

<Properties>

The heat insulating window film of the invention has excellent visible light transmittance, shielding properties for near infrared light, heat insulating properties, and light resistance. Preferable ranges of each of properties are the same as preferable ranges in the examples which will be described later.

<Configuration>

A configuration of the heat insulating window film of the invention will be described.

FIG. 1 shows a schematic view showing a cross section of an example of a heat insulating window glass of the invention including the heat insulating window film of the invention. A heat insulating window glass 111 of the invention includes a heat insulating window film 103 of the invention and a glass 61. The heat insulating window film 103 of the invention is disposed on the inner side of the window (indoor side, side opposite to a sunlight incident side during daytime, IN side in FIG. 1), in a case where the glass 61 is a part of the window (window glass).

The heat insulating window film 103 of the invention at least includes a support 10 and a fibrous conductive particles-containing layer 20 disposed on the support 10.

The fibrous conductive particles-containing layer 20 is disposed on a surface of the support 10 on a side opposite to a surface on the window (glass 61) side. In the invention, it is preferable that the fibrous conductive particles-containing layer 20 is the outermost layer or the second outermost layer on the indoor side, in a viewpoint of increasing heat insulating properties, and it is more preferable that the fibrous conductive particles-containing layer is the outermost layer on the indoor side.

The heat insulating window film 103 of the invention includes a near infrared shielding material. In FIG. 1, the heat insulating window film 103 of the invention includes a near infrared shielding layer 41 including a near infrared shielding material. The near infrared shielding material may be contained in other layers, without independently forming the near infrared shielding layer 41. The near infrared shielding material, for example, may be included in the fibrous conductive particles-containing layer 20, may be included in a first adhesive layer 31 or a second adhesive layer 32, or may be included in a pressure sensitive adhesive layer 51. It is preferable that the near infrared shielding material is included in a surface of the support 10 on a side of a surface on the window (glass 61), from a viewpoint of shielding near infrared rays.

A laminate obtained by bonding the support and the fibrous conductive particles-containing layer 20 provided on the support through an adhesive layer may be referred to as a heat insulating member 102. The adhesive layer may be a single layer or may be a laminate of two or more layers, and the adhesive layer in FIG. 1 is a laminate of the first adhesive layer 31 and the second adhesive layer 32. In addition, a laminate obtained by providing the adhesive layer (laminate of the first adhesive layer 31 and the second adhesive layer 32 in FIG. 1) on the support 10 may be referred to as an adhesive layer-attached support 101.

In the heat insulating window film 103 of the invention, it is preferable that the pressure sensitive adhesive layer 51 is provided on a surface of the support 10 on the window (glass 61) side and it is preferable that the glass 61 and the pressure sensitive adhesive layer 51 are bonded to each other.

Hereinafter, preferred embodiments of each layer configuring the heat insulating window film of the invention will be described.

<Support>

Various elements can be used as the support described above according to the purpose, as long as it can shoulder the fibrous conductive particles-containing layer. Generally, a plate-shaped or a sheet-shaped material is used.

The support may be transparent or may be opaque. Examples of a material configuring the support include transparent glass such as white plate glass, blue plate glass, or silica-coated blue plate glass; a synthetic resin such as polycarbonate, polyether sulfone, polyester, an acrylic resin, a vinyl chloride resin, an aromatic polyamide resin, polyamide imide, or polyimide; metal such as aluminum, copper, nickel, or stainless steel; ceramic; and a silicon wafer used in a semiconductor substrate. The surface of the support where the fibrous conductive particles-containing layer is formed may be previously treated by purification treatment using an alkaline aqueous solution, chemical treatment using a silane coupling agent, plasma treatment, ion plating, sputtering, a gas phase reaction method, and vacuum evaporation, if desired.

A thickness of the support is in a desired range according to the purpose. In general, the thickness thereof is selected from a range of 1 μm to 500 μm, is more preferably from 3 μm to 400 μm, and even more preferably from 5 μm to 300 μm.

Visible light transmittance of the support is preferably equal to or greater than 70%, more preferably equal to or greater than 85%, and even more preferably equal to or greater than 90%. The visible light transmittance of the support is measured based on ISO 13468-1 (1996) (ISO stands for International Organization for Standardization).

<Fibrous Conductive Particles-Containing Layer>

The fibrous conductive particles-containing layer contains fibrous conductive particles.

Figure 7:
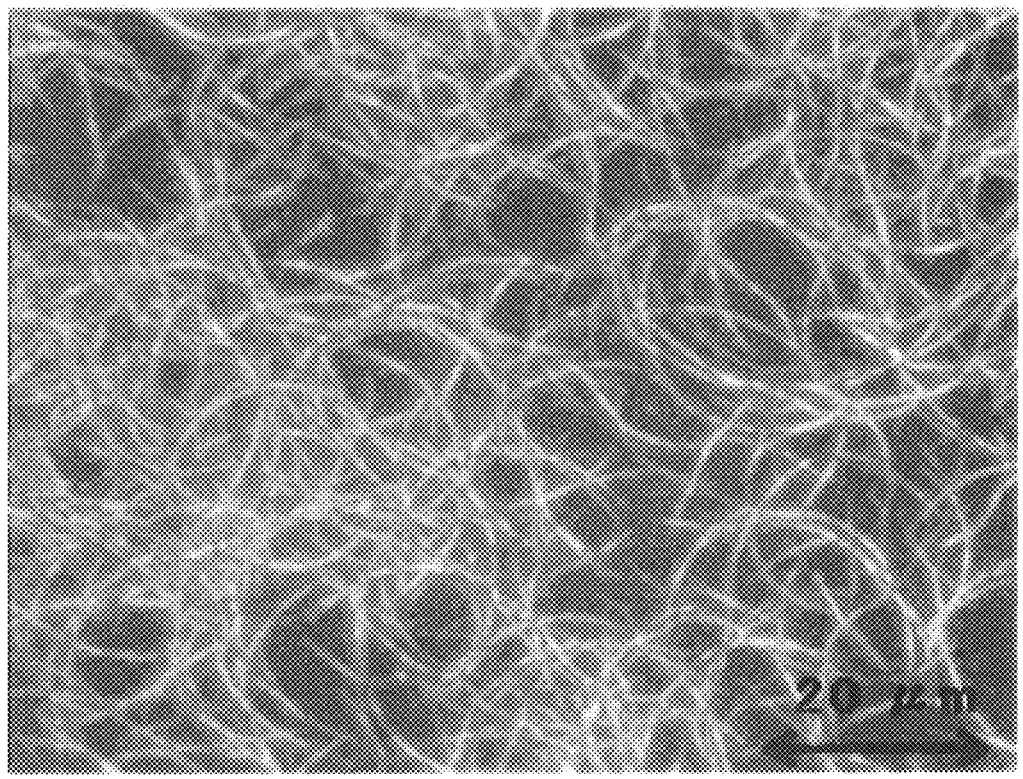
FIG. 7 is an electron micrograph showing a state of arrangement of fibrous conductive particles.

FIG. 7 shows a microphotograph of a representative example of the fibrous conductive particles-containing layer. The fibrous conductive particles-containing layer preferably has a structure shown in FIG. 7. For example, a void side thereof is preferably small, in order to reflect far infrared rays. In a cross section of the fibrous conductive particles-containing layer, for example, 80% or more voids more preferably have a void area of 25 (μm)$^2$ or less.

(Fibrous Conductive Particles)

The fibrous conductive particles have a fibrous shape and the fibrous shape has the same meaning as a wire shape or a liner shape.

The fibrous conductive particles have conductivity.

As the fibrous conductive particles, metal nanowires, rod-shaped metal particles, or carbon nanotubes can be used. Metal nanowires are preferable as the fibrous conductive particles. Hereinafter, the metal nanowires will be described as a representative example of the fibrous conductive particles, but the description of the metal nanowires can be used as general description of the fibrous conductive particles.

The fibrous conductive particles-containing layer preferably contains metal nanowires having an average short axis length equal to or smaller than 150 nm as fibrous conductive particles. The average short axis length is preferably equal to or smaller than 150 nm, because heat insulating properties are improved and optical characteristics are hardly deteriorated due to light scattering. The fibrous conductive particles such as metal nanowires preferably have a solid structure.

In order to easily form more transparent fibrous conductive particles-containing layer, fibrous conductive particles having an average short axis length of 1 nm to 150 nm and an average long axis length of 1 µm and 100 µm are preferable, for example, as the fibrous conductive particles such as metal nanowires.

From easiness of handling at the time of the manufacturing, an average short axis length (average diameter) of the fibrous conductive particles such as metal nanowires is preferably equal to or smaller than 100 nm, more preferably equal to or smaller than 60 nm, and even more preferably equal to or smaller than 50 nm, and the average short axis length thereof is particularly equal to or smaller than 25 nm, because more excellent properties with respect to haze are obtained. When the average short axis length thereof is equal to or greater than 1 nm, a fibrous conductive particles-containing layer having excellent oxidation resistance and excellent weather resistance. The average short axis length thereof is more preferably equal to or greater than 5 nm, even more preferably equal to or greater than 10 nm, and particularly preferably equal to or greater than 15 nm.

The average short axis length of the fibrous conductive particles such as metal nanowires is preferably from 1 nm to 100 nm, more preferably from 5 nm to 60 nm, even more preferably from 10 nm to 60 nm, and particularly preferably from 15 nm to 50 nm, from viewpoints of a haze value, oxidation resistance, and weather resistance.

The average long axis length of the fibrous conductive particles such as metal nanowires is preferably from 5 µm to 50 µm, more preferably from 10 µm to 40 µm, and even more preferably from 15 µm to 40 µm. When the average long axis length of the metal nanowires is equal to or smaller than 50 µm, synthesis of metal nanowires is easily performed without generating aggregates, and when the average long axis length thereof is equal to or greater than 5 µm, sufficient heat insulating properties are easily obtained.

The average short axis length (average diameter) and the average long axis length of fibrous conductive particles such as metal nanowires can be acquired by observing a transmission electron microscope (TEM) image or an optical microscope image by using a TEM and an optical microscope, for example. Specifically, regarding the average short axis length (average diameter) and the average long axis length of fibrous conductive particles such as metal nanowires, short axis lengths and long axis lengths of 300 metal nanowires randomly selected are measured by using a transmission electron microscope (JEOL, Ltd., product name: JEM-2000FX) and the average short axis length and the average long axis length of fibrous conductive particles such as metal nanowires can be acquired from the average values thereof. In this specification, the values obtained by using this method are used. Regarding the short axis length in a case where a cross section of the metal nanowires in a short axis direction does not have a circular shape, a length of the longest portion obtained by measuring a length in a short axis direction is set as the short axis length. In addition, in a case where the fibrous conductive particles such as metal nanowires are curved, a circle having the curved shape as an arc is considered, and a value calculated from the radius thereof and curvature is set as the long axis length.

In the embodiment, a content of fibrous conductive particles such as metal nanowires having a short axis length (diameter) equal to or smaller than 150 nm and a long axis length of 5 µm to 500 µm with respect to a content of fibrous conductive particles such as the entire metal nanowires of the fibrous conductive particles-containing layer is preferably equal to or greater than 50% by mass, more preferably equal to or greater than 60% by mass, and even more preferably equal to or greater than 75% by mass, in terms of the metal amount. It is preferable that a rate of the fibrous conductive particles such as metal nanowires having a short axis length (diameter) equal to or smaller than 150 nm and a long axis length of 5 µm to 500 µm is equal to or greater than 50% by mass, because a percentage of metal nanowires which easily reflect far infrared rays at a wavelength of 5 µm to 50 µm is increased. In a configuration in which conductive particles other than the fibrous conductive particles are not substantially contained in the fibrous conductive particles-containing layer, a decrease in transparency can be avoided, even in a case of strong plasmon absorption.

A coefficient of variation of the short axis lengths (diameters) of the fibrous conductive particles such as metal nanowires used in the fibrous conductive particles-containing layer is preferably equal to or smaller than 40%, more preferably equal to or smaller than 35%, and even more preferably equal to or smaller than 30%.

The coefficient of variation is preferably equal to or smaller than 40%, from a viewpoint of transparency.

The coefficient of variation of the short axis lengths (diameters) of the fibrous conductive particles such as metal nanowires can be acquired by measuring short axis lengths (diameters) of 300 nanowires randomly selected from a transmission electron microscope (TEM), for example, calculating a standard deviation and an arithmetic mean value thereof, and dividing the standard deviation by the arithmetic mean value.

—Aspect Ratio of Fibrous Conductive Particles—

An aspect ratio of the fibrous conductive particles such as metal nanowires used in the invention is preferably equal to or greater than 10. Here, the aspect ratio means a ratio of the average long axis length to the average short axis length (average long axis length/average short axis length). The aspect ratio can be calculated from the average long axis length and the average short axis length calculated by using the method described above.

The aspect ratio of the fibrous conductive particles such as metal nanowires is not particularly limited, as long as it is equal to or greater than 10. The aspect ratio thereof can be suitably selected according to the purpose, and is preferably from 10 to 100,000, more preferably from 50 to 100,000, and even more preferably from 100 to 100,000.

When the aspect ratio is equal to or greater than 10, a network in which the fibrous conductive particles such as metal nanowires are in contact with each other is easily formed, and a fibrous conductive particles-containing layer having high heat insulating properties is easily obtained. When the aspect ratio is equal to or smaller than 100,000, formation of aggregates due to a tangle of the fibrous conductive particles such as metal nanowires in a coating solution used when providing the fibrous conductive particles-containing layer on the support by coating, for example, and a stable coating solution is obtained, and accordingly, the fibrous conductive particles-containing layer is easily manufactured.

The content of the fibrous conductive particles such as metal nanowires having an aspect ratio equal to or greater than 10 with respect to the mass of the fibrous conductive particles such as the entire metal nanowires contained in the fibrous conductive particles-containing layer is particularly limited. The content is, for example, preferably equal to or greater than 70% by mass, more preferably equal to or greater than 75% by mass, and most preferably equal to or greater than 80% by mass.

A shape of the fibrous conductive particles such as metal nanowires may be arbitrary shapes such as a cylindrical shape, a rectangular parallelepiped shape, or a columnar shape having a polygonal cross section. When a high transparency is necessary, a cylindrical shape or a polygonal shape having a pentagonal or more polygonal cross section and having a cross sectional shape without a sharp-pointed angle is preferable.

The cross sectional shape of the fibrous conductive particles such as metal nanowires can be detected by applying a fibrous conductive particles aqueous dispersion such as metal nanowires on a support and observing a cross section with a transmission electron microscope (TEM).

The metal for forming the fibrous conductive particles such as metal nanowires is not particularly limited and any metal may be used. In addition to one kind of metal, a combination of two or more kinds of metal may be used and an alloy thereof can be used. Among these, the metal is preferably formed of a metal alone or a metal compound, and the metal is more preferably formed of a metal alone.

As the metal, at least one kind of metal selected from the group consisting metals of fourth, fifth, and sixth period in a long-form periodic table (IUPAC (The International Union of Pure and Applied Chemistry) 1991) is preferable, at least one kind of metal selected from second to fourteenth groups is more preferable, at least one kind of metal selected from the second group, the eighth group, the ninth group, the tenth group, the eleventh group, the twelfth group, the thirteenth group, and the fourteenth group is even more preferable, and it is particularly preferable that these metals are contained as a main component.

Specific examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, and an alloy containing any one of these. Among these, copper, silver, gold, platinum, palladium, nickel, tin, cobalt, rhodium, iridium, or an alloy thereof is preferable, palladium, copper, silver, gold, platinum, tin, or an alloy of any one of these is more preferable, and silver or an alloy containing silver is particularly preferable. Here, a content of silver in an alloy containing silver is preferably equal to or greater than 50 mol %, more preferably equal to or greater than 60 mol %, and even more preferably equal to or greater than 80 mol % with respect to the entire quantity of the alloy.

The fibrous conductive particles such as metal nanowires contained in the fibrous conductive particles-containing layer preferably contains silver nanowires, from a viewpoint of realizing high heat insulating properties. It is more preferable to contain silver nanowires having an average short axis length of 1 nm to 150 nm and an average long axis length of 1 μm and 100 μm and even more preferable to contain silver nanowires having an average short axis length of 5 nm to 30 nm and an average long axis length of 5 μm to 30 μm. The content of silver nanowires with respect to the mass of the fibrous conductive particles such as the entire metal nanowires contained in the fibrous conductive particles-containing layer is not particularly limited, as long as it does not disturb the effects of the invention. The content of silver nanowires with respect to the mass of the fibrous conductive particles such as the entire metal nanowires contained in the fibrous conductive particles-containing layer is, for example, preferably equal to or greater than 50% by mass and more preferably equal to or greater than 80% by mass, and it is even more preferable that the fibrous conductive particles such as the entire metal nanowires are substantially silver nanowires. Here, the term "substantially" means that inevitably mixed metal atoms other than silver are accepted.

The content of the fibrous conductive particles such as metal nanowires contained in the fibrous conductive particles-containing layer is preferably set as an amount so that visible light transmittance and a haze value of the fibrous conductive particles-containing layer are in desired ranges, in accordance of the type of the fibrous conductive particles such as metal nanowires. In a case of silver nanowires, for example, the content per unit area of the fibrous conductive particles of the fibrous conductive particles-containing layer (content (grams) of the fibrous conductive particles such as metal nanowires per 1 $m^2$ of the fibrous conductive particles-containing layer) can be, for example, in a range of 0.001 $g/m^2$ to 0.500 $g/m^2$, is preferably in a range of 0.02 $g/m^2$ to 0.200 $g/m^2$, more preferably in a range of 0.010 $g/m^2$ to 0.100 $g/m^2$, and particularly preferably in a range of 0.020 $g/m^2$ to 0.050 $g/m^2$.

From a viewpoint of heat insulating properties, the fibrous conductive particles-containing layer preferably contains fibrous conductive particles such as metal nanowires having an average short axis length of 5 nm to 60 nm in a range of the content of 0.001 $g/m^2$ to 0.500 $g/m^2$, more preferably contains fibrous conductive particles such as metal nanowires having an average short axis length of 10 nm to 60 nm in a range of the content of 0.02 $g/m^2$ to 0.200 $g/m^2$, and particularly preferably contains fibrous conductive particles such as metal nanowires having an average short axis length of 20 nm to 50 nm in a range of the content of 0.010 $g/m^2$ to 0.100 $g/m^2$. The content thereof is more particularly preferably from 0.020 $g/m^2$ to 0.050 $g/m^2$.

—Manufacturing Method of Fibrous Conductive Particles—

The fibrous conductive particles such as metal nanowires are not particularly limited and may be manufactured by any method. As will be described below, it is preferable that the fibrous conductive particles are manufactured by reducing metal ions in a solvent obtained by dissolving a halogen compound and a dispersing agent. After fibrous conductive particles such as metal nanowires are formed, desalinization treatment is performed in a routine procedure, and this operation is preferable from viewpoints of dispersibility and temporal stability of the fibrous conductive particles-containing layer.

As the manufacturing method of the fibrous conductive particles such as metal nanowires, methods disclosed in JP2009-215594A, JP2009-242880A, JP2009-299162A, and JP2010-84173A, JP2010-86714 can be used.

As a solvent used in the manufacturing of the fibrous conductive particles such as metal nanowires, a hydrophilic solvent is preferable, and examples thereof include water, an alcohol solvent, an ether solvent, and a ketone solvent. These may be used alone or in combination of two or more kinds thereof.

Examples of the alcohol solvent include methanol, ethanol, propanol, isopropanol, butanol, and ethylene glycol.

Examples of the ether solvent include dioxane and tetrahydrofuran.

Examples of the ketone solvent include acetone and the like.

In a case of performing heating, a heating temperature thereof is preferably equal to or lower than 250° C., more preferably from 20° C. to 200° C., even more preferably from 30° C. to 180° C., and particularly preferably from 40° C. to 170° C. When the temperature is equal to or higher than 20° C., a length of the fibrous conductive particles such as metal nanowires formed is in a preferable range so as to ensure dispersion stability, and when the temperature is equal to or lower than 250° C., the periphery of the cross section of the metal nanowires has a smooth shape without acute angles, and accordingly, coloration due to surface plasmon absorption of the metal particles is prevented. Therefore, the range thereof is preferable from a viewpoint of transparency.

The temperature may be changed during a particle formation process, if necessary, and the temperature change during the process may have effects of control of nucleus formation or prevention of regeneration of nucleus, and improvement of monodispersity due to improvement of selective growth.

The heating process is preferably performed by adding a reducing agent.

The reducing agent is not particularly limited and can be suitably selected from elements normally used. Examples thereof include borohydride metal salt, aluminum hydride salt, alkanolamine, aliphatic amine, heterocyclic amine, aromatic amine, aralkyl amine, alcohols, organic acids, reducing sugars, sugar alcohols, sodium sulfite, hydrazine compounds, dextrin, hydroquinone, hydroxylamine, ethylene glycol, and glutathione. Among these, reducing sugars, sugar alcohols as a derivative thereof, and ethylene glycol are particularly preferable.

As a reducing agent, a compound having a function as both of a dispersing agent or a solvent can be preferably used, in the same manner.

The fibrous conductive particles such as metal nanowires are preferably manufactured by adding a dispersing agent and halogen compounds or metal halide fine particles.

The timing of adding a dispersing agent and halogen compounds may be before adding a reducing agent or after adding a reducing agent or may be before adding metal ions or metal halide fine particles or after adding metal ions or metal halide fine particles. In order to obtain fibrous conductive particles having better monodispersity, the adding of halogen compounds is preferably divided into two or more steps, because nucleus formation and growth can be controlled.

The step of adding a dispersing agent is not particularly limited. A dispersion agent may be added before preparing the fibrous conductive particles such as metal nanowires and the fibrous conductive particles such as metal nanowires may be added under the presence of the dispersing agent, or a dispersing agent may be added after preparing the fibrous conductive particles such as metal nanowires, in order to control a dispersion state.

Examples of the dispersing agent include an amino group-containing compound, a thiol group-containing compound, a sulfide group-containing compound, amino acid or a derivative thereof, a peptide compounds, polysaccharides, a polysaccharides-derived natural polymer, a synthetic polymer, and polymer compounds such as gel derived therefrom.

Among these, various polymer compounds used as a dispersing agent are compounds contained in polymers which will be described below.

Preferable examples of polymers used as a dispersing agent include polymers including a hydrophilic group such as gelatin, polyvinyl alcohol, methyl cellulose, hydroxypropyl cellulose, polyalkylene amine, partial alkyl ester of polyacrylic acid, polyvinyl pyrrolidone, a copolymer having a polyvinyl pyrrolidone structure, and polyacrylic acid having an amino group or a thiol group which are protective colloid polymers. A weight average molecular weight (Mw) of the polymer used as a dispersing agent measured by using gel permeation chromatography (GPC) is preferably from 3,000 to 300,000 and more preferably from 5,000 to 100,000.

The description in "Genryo No Jiten" (edited by Seijiro Ito, published by Asakura Publishing, 2000) can be referred for the structure of a compound capable of being used as a dispersion agent.

A shape of metal nanowires obtained can be changed depending on the kind of a dispersing agent used.

The halogen compound is not particularly limited, as long as it is a compound containing bromine, chlorine, and iodine, and can be suitably selected according to the purpose. Preferable examples thereof include alkali halide such as sodium bromide, sodium chloride, sodium iodide, potassium iodide, potassium bromide, potassium chloride, or potassium iodide, or a compound capable of being used in combination with the following dispersion additive. The halogen compound may function as a dispersion additive and the dispersion additive can be preferably used in the same manner.

Silver halide fine particles may be used as a substitute of the halogen compound, or a halogen compound and silver halide fine particles may be used in combination.

In addition, a single substance having both a function of a dispersing agent and a function of a halogen compound may be used. That is, both functions of a dispersing agent and a halogen compound are realized with one compound, by using a halogen compound having a function as a dispersing agent.

Examples of the halogen compound having a function as a dispersing agent include hexadecyl-trimethyl ammonium bromide containing an amino group and bromide ions, hexadecyl-trimethyl ammonium chloride containing an amino group and chloride ions, dodecyltrimethylammonium bromide containing an amino group and bromide ions or chloride ions, dodecyltrimethylammonium chloride, stearyltrimethylammonium bromide, stearyltrimethylammonium chloride, decyltrimethylammonium bromide, decyltrimethylammonium chloride, dimethyldistearylammonium bromide, dimethyldistearylammonium chloride, dilauryldimethylammonium bromide, dilauryldimethylammonium chloride, dimethyldipalmitylammonium bromide, and dimethyldipalmitylammonium chloride. In the manufacturing method of the metal nanowires, it is preferable to perform desalinization treatment after forming the metal nanowires. The desalinization treatment after forming the metal nanowires can be performed by using methods such as ultrafiltration, dialysis, gel filtration, decantation, and centrifugal separation.

It is preferable that the fibrous conductive particles such as metal nanowires do not contain inorganic ions such as alkali metal ions, alkali earth metal ions, and halide ions, if possible. Electric conductivity of a dispersed material obtained by dispersing metal nanowires in an aqueous solvent is preferably equal to or smaller than 1 mS/cm, more preferably equal to or smaller than 0.1 mS/cm, and even more preferably equal to or smaller than 0.05 mS/cm.

Viscosity of the aqueous dispersed material of the fibrous conductive particles such as metal nanowires at 25° C. is preferably from 0.5 mPa·s to 100 mPa·s and more preferably from 1 mPa·s to 50 mPa·s.

The electric conductivity and the viscosity are measured by setting concentration of the fibrous conductive particles such as metal nanowires in the aqueous dispersed material as 0.45% by mass. In a case where the concentration of the fibrous conductive particles such as metal nanowires in the aqueous dispersed material is higher than the above-mentioned concentration, the measurement is performed by diluting the aqueous dispersed material with a distilled water.

An average film thickness of the fibrous conductive particles-containing layer is normally selected from a range of 0.005 μm to 2 μm. For example, when the average film thickness thereof is from 0.001 μm to 0.5 μm, sufficient durability and film strength are obtained. Particularly, the average film thickness thereof is preferably in a range of 0.01 μm to 0.1 μm, because the allowable range in the manufacturing can be ensured.

In the invention, it is preferable that, by providing a fibrous conductive particles-containing layer satisfying at least one of the following condition (i) or (ii), high heat insulating properties and transparency are maintained, fibrous conductive particles such as metal nanowires are stably solidified due to a sol-gel hardened material, and high strength and durability are realized. Even when the fibrous conductive particles-containing layer is a thin layer having a film thickness of 0.005 μm to 0.5 μm, for example, it is possible to obtain a fibrous conductive particles-containing layer having abrasion resistance, heat resistance, moist heat resistance, and bending resistance without practical problems. Accordingly, the heat insulating window film of the embodiment of the invention is suitably used for various purposes. When it is necessary to provide a thin layer, a film thickness thereof may be from 0.005 μm to 0.5 μm, preferably from 0.007 μm to 0.3 μm, more preferably from 0.008 μm to 0.2 μm, and particularly preferably from 0.01 μm to 0.1 μm. By setting the fibrous conductive particles-containing layer to be a thinner layer as described above, transparency of the fibrous conductive particles-containing layer is further improved.

Regarding an average film thickness of the fibrous conductive particles-containing layer, film thicknesses of five spots of the fibrous conductive particles-containing layer are measured by directly observing the cross section of the fibrous conductive particles-containing layer using an electron microscope, and an arithmetic average value thereof is calculated. In addition, the film thickness of the fibrous conductive particles-containing layer can also be measured as a level difference between a portion where the fibrous conductive particles-containing layer is formed and a portion where the fibrous conductive particles-containing layer is removed, by using a stylus type surface shape measurement device (Dektak (registered trademark) 150, manufactured by Bruker AXS K.K.). However, some parts of the support may be removed when removing the fibrous conductive particles-containing layer and an error regarding the fibrous conductive particles-containing layer formed easily occurs, because the fibrous conductive particles-containing layer is a thin film. Therefore, in the following examples, the average film thickness measured by using an electron microscope is shown.

It is preferable that the fibrous conductive particles-containing layer has excellent abrasion resistance. This abrasion resistance can be evaluated, for example, by using a method of (1) or (2) disclosed in paragraph "0067" of JP2013-225461A.

(Matrix)

The fibrous conductive particles-containing layer may contain a matrix. Here, a "matrix" is a general term of substances forming a layer including fibrous conductive particles such as metal nanowires. By containing a matrix, a dispersion state of fibrous conductive particles such as metal nanowires of the fibrous conductive particles-containing layer is stably maintained, and even in a case where the fibrous conductive particles-containing layer is formed on the surface of the support without using the adhesive layers, strong adhesion between the support and the fibrous conductive particles-containing layer tends to be ensured.

—Sol-Gel Hardened Material—

The fibrous conductive particles-containing layer preferably contains a sol-gel hardened material having a function as a matrix, and more preferably contains a sol-gel hardened material obtained by hydrolysis and polycondensation of an alkoxide compound of an element (b) selected from the group consisting of Si, Ti, Zr, and Al.

The fibrous conductive particles-containing layer more preferably contains at least a metal element (a), metal nanowires having an average short axis length equal to or smaller than 150 nm, and a sol-gel hardened material obtained by hydrolysis and polycondensation of an alkoxide compound of an element (b) selected from the group consisting of Si, Ti, Zr, and Al.

The fibrous conductive particles-containing layer preferably satisfies at least one of the following condition (i) or (ii), more preferably satisfies at least the following conditions (ii), and particularly preferably satisfies the following conditions (i) and (ii).

(i) A ratio of substance quantity of the element (b) contained in the fibrous conductive particles-containing layer and substance quantity of the metal element (a) contained in the fibrous conductive particles-containing layer [molar number of (element (b))/molar number of (metal element (a))] is in a range of 0.10/1 to 22/1.

(ii) A ratio of a mass of the alkoxide compound used for forming the sol-gel hardened material in the fibrous conductive particles-containing layer to a mass of metal nanowires contained in the fibrous conductive particles-containing layer [(content of alkoxide compound)/(content of metal nanowires)] is in a range of 0.25/1 to 30/1.

It is preferable that the fibrous conductive particles-containing layer is formed so that a ratio of a usage amount of a specified alkoxide compound with respect to a usage amount of metal nanowires, that is, a ratio of [(mass of specified alkoxide compound)/(mass of metal nanowires)] is in a range of 0.25/1 to 30/1. In a case where the mass ratio is equal to or greater than 0.25/1, it is possible to obtain a fibrous conductive particles-containing layer having excellent heat insulating properties (this may be due to high conductivity of the fibrous conductive particles) and transparency, and excellent abrasion resistance, heat resistance, moist heat resistance, and bending resistance. In a case where the mass ratio is equal to or smaller than 30/1, it is possible to obtain a fibrous conductive particles-containing layer having excellent conductivity and bending resistance.

The mass ratio is more preferably in a range of 0.5/1 to 25/1, even more preferably in a range of 1/1 to 20/1, and most preferably in a range of 2/1 to 15/1. By setting the mass ratio to be in the preferable range, the fibrous conductive particles-containing layer obtained has high heat insulating properties and high transparency (visible light transmittance and haze), and excellent abrasion resistance, heat resistance, moist heat resistance, and bending resistance, and accordingly, it is possible to stably obtain a heat insulating window film having suitable physical properties.

As an optimal state, in the fibrous conductive particles-containing layer, the ratio of substance quantity of the element (b) and substance quantity of the metal element (a) [molar number of (element (b))/molar number of (metal element (a))] is in a range of 0.10/1 to 22/1. The molar ratio is more preferably from 0.20/1 to 18/1, particularly preferably from 0.45/1 to 15/1, more particularly preferably from 0.90/1 to 11/1, and even more particularly preferably from 1.5/1 to 10/1.

When the molar ratio is in the range described above, the fibrous conductive particles-containing layer has both of heat insulating properties and transparency, and has excellent abrasion resistance, heat resistance, moist heat resistance, and bending resistance, from a viewpoint of physical properties.

The specified alkoxide compound used when forming the fibrous conductive particles-containing layer is used up due to hydrolysis and polycondensation and substantially no alkoxide compound is present in the fibrous conductive particles-containing layer, but the fibrous conductive particles-containing layer obtained contains the element (b) such as Si or the like derived from the specified alkoxide compound. By adjusting the ratio of the substance quantity of the element (b) such as Si contained and the metal element (a) derived from metal nanowires, the fibrous conductive particles-containing layer having excellent properties is formed.

A component of the element (b) selected from the group consisting of Si, Ti, Zr, and Al derived from the specified alkoxide compound of the fibrous conductive particles-containing layer and a component of the metal element (a) derived from metal nanowires can be analyzed by the following method.

That is, the ratio of the substance quantity, that is, the value of (component molar number of (element (b))/component molar number of (metal element (a)) can be calculated by performing X ray photoelectron analysis (Electron Spectroscopy FOR Chemical Analysis (ESCA)) with respect to the fibrous conductive particles-containing layer. However, since measurement sensitivity is different depending on an element in the analysis method using ESCA, a value obtained does not necessarily directly show a molar ratio of the element components. Accordingly, a calibration curve is drawn by using a fibrous conductive particles-containing layer having a well-known molar ratio of element components in advance, and a ratio of substance quantity of the actual fibrous conductive particles-containing layer can be calculated from the calibration curve. As the molar ratio of each element in this specification, a value calculated by using the following method is used.

The heat insulating window film preferably exhibits effects of obtaining high heat insulating properties and transparency and excellent abrasion resistance, heat resistance, moist heat resistance, and bending resistance. The reason of exhibiting such effects is not clear, but the following reasons are assumed.

That is, since the fibrous conductive particles-containing layer contains metal nanowires, and a matrix which is a sol-gel hardened material obtained by hydrolysis and polycondensation of the specified alkoxide compound, a dense fibrous conductive particles-containing layer having less voids and high crosslinking density is formed, even when the rate of the matrix contained in the fibrous conductive particles-containing layer is small, compared to a fibrous conductive particles-containing layer containing a general organic polymer resin (for example, an acrylic resin, a vinyl polymerization resin, or the like) as a matrix, and accordingly, a heat insulating window film having excellent abrasion resistance, heat resistance, and moist heat resistance is obtained. It is assumed that, by satisfying any one of setting the content molar ratio of the element (b) derived from the specified alkoxide compound/metal element (a) derived from metal nanowires in a range of 0.25/1 to 30/1 and setting the mass ratio of the specified alkoxide compound/metal nanowires in a range of 0.25/1 to 30/1, in relation to the above-mentioned content molar ratio which is in a range of 0.25/1 to 30/1, the operation is improved with good balance, heat insulating properties and transparency are maintained, and excellent abrasion resistance, heat resistance, and moist heat resistance, and excellent bending resistance are exhibited.

—Other Matrix—

The sol-gel hardened material contained in the fibrous conductive particles-containing layer has a function as a matrix, but the fibrous conductive particles-containing layer may further contain matrix other than the sol-gel hardened material (hereinafter, referred to as other matrix). The fibrous conductive particles-containing layer containing other matrix contains a material capable of forming other matrix in a liquid composition which will be described later, and may be formed by applying this on the support.

The other matrix may be nonphotosensitive such as an organic polymer or may be photosensitive such as a photoresist composition.

In a case where the fibrous conductive particles-containing layer contains other matrix, the content thereof is from 0.10% by mass to 20% by mass, preferably from 0.15% by mass to 10% by mass, and even more preferably from 0.20% by mass to 5% by mass, with respect to the content of the sol-gel hardened material derived from the specified alkoxide compound contained in the fibrous conductive particles-containing layer, because a fibrous conductive particles-containing layer having excellent heat insulating properties, transparency, film strength, abrasion resistance, and bending resistance is obtained.

The other matrix may be nonphotosensitive or may be photosensitive as described above. A nonphotosensitive matrix is preferable.

—Organic Polymer—

The preferable nonphotosensitive matrix contains an organic polymer. Specific examples of the organic polymer include polyacrylic acid such as polymethacrylic acid, polymethacrylate (for example, poly (methyl methacrylate)), polyacrylate, or polyacrylonitrile, a highly aromatic polymer such as polyvinyl alcohol, polyesters (e.g., polyethylene terephthalate (PET), polyester naphthalate, and polycarbonate), phenol or cresol formaldehyde (Novolacs (registered trademark)), polystyrene, polyvinyl toluene, polyvinyl xylene, polyimide, polyamide, polyamideimide, polyetherimide, polysulfide, polysulfone, polyphenylene, or polyphenylether, polyurethane, epoxy, polyolefin (e.g., polypropylene, polymethylpentene, and cyclic olefins), acrylonitrile-butadiene-styrene copolymer, cellulose, silicone, and other silicon-containing polymer (for example, polysilsesquioxane and polysilane), polyvinyl chloride, polyvinyl acetate, polynorbornene, synthetic rubber, (for example, ethylene propylene rubber (EPR), styrene-butadiene rubber (SBR), ethylene propylene diene monomer rubber (EPDM)), and a fuorocarbon-based polymer (for example, polyvinylidene fluoride, polytetrafluoroethylene, or polyhexafluoropropylene), a fluoro-olefin copolymer, hydrocarbon olefin (for example, "LUMIFLON" (registered trademark) manufactured by Asahi Glass Co., Ltd.), an amorphous fluorocarbon polymer or copolymer (for example, "CYTOP" (registered trademark) manufactured by Asahi Glass Co., Ltd., and "Teflon" (registered trademark) AF manufactured by Dupont), and there is no limitation.

—Crosslinking Agent—

A crosslinking agent is a compound which forms a chemical bond by free radicals or acids and heat and hardens a conductive layer, and examples thereof include a melamine-based compound substituted with at least one selected from a methylol group, an alkoxymethyl group, and an acyloxymethyl group, a guanamine-based compound, a glycoluril-based compound, a urea-based compound, a phenol-based compound or an ether compound of phenol, an epoxy-based compound, an oxetane-based compound, a thioepoxy-based compound, an isocyanate-based compound, or an amide-based compound, and a compound having an ethylenically unsaturated group containing a methacryloyl group or an acryloyl group. Among these, an epoxy-based compound, an oxetane-based compound, and a compound having an ethylenically unsaturated group are particularly preferable, from viewpoints of film properties, heat resistance, and solvent resistance.

An oxetane-based compound can be used alone or in a mixture with an epoxy resin. Particularly, it is preferable to use an oxetane-based compound together with an epoxy resin, from viewpoints of high reactivity and improvement of film properties.

When the total mass of a solid content of a photopolymerizable composition containing the fibrous conductive particles such as metal nanowires described above is 100 parts by mass, the content of the crosslinking agent in the fibrous conductive particles-containing layer is preferably from 1 part by mass to 250 parts by mass and more preferably from 3 part by mass to 200 parts by mass.

—Dispersing Agent—

A dispersing agent is used for dispersing the fibrous conductive particles such as metal nanowires in the photopolymerizable composition while preventing aggregation thereof. The dispersing agent is not particularly limited as long as it can disperse metal nanowires and can be suitably selected according to the purpose. For example, a dispersing agent which is commercially available as a pigment dispersing agent can be used, and it is preferable to use particularly a polymer dispersing agent having properties of being adsorbed to metal wires. Examples of such a polymer dispersing agent include polyvinylpyrrolidone, BYK SERIES (registered trademark, manufactured by BYK Additives & Instruments), SOLSPERSE SERIES (manufactured by The Lubrizol Corporation), and AJISPER SERIES (manufactured by Ajinomoto Co., Inc.).

The content of the dispersing agent in the fibrous conductive particles-containing layer is preferably from 0.1 parts by mass to 50 parts by mass, more preferably from 0.5 parts by mass to 40 parts by mass, and particularly preferably from 1 part by mass to 30 parts by mass, with respect to 100 parts by mass of a binder in a case of using a binder disclosed in paragraphs "0086" to "0095" of JP2013-225461A.

When the content of the dispersing agent with respect to the binder is equal to or greater than 0.1 parts by mass, aggregation of the fibrous conductive particles such as metal nanowires in a dispersion is effectively prevented, and when the content thereof is equal to or smaller than 50 parts by mass, a stable liquid film is formed in a coating step and generation of coating unevenness is prevented, and thus, the ranges described above are preferable.

—Solvent—

A solvent is a component used for preparing a coating solution for forming a composition containing the fibrous conductive particles such as metal nanowires, the specified alkoxide compound, and the photopolymerizable composition on the surface of the support or a surface of an adhesive layer of an adhesive layer-attached support to have a film shape, and can be suitably selected according to the purpose. Examples thereof include propylene glycol monomethyl ether, propylene glycol monomethyl ether acetate, ethyl 3-ethoxypropionate, methyl 3-methoxypropionate, ethyl lactate, 3-methoxy butanol, water, 1-methoxy-2-propanol, isopropyl acetate, methyl lactate, N-methylpyrrolidone, γ-butyrolactone, and propylene carbonate. This solvent may serve as at least some of the solvent of the dispersion of the metal nanowires described above. These may be used alone or in combination of two or more kinds thereof.

A solid content concentration of the coating solution containing the solvent is preferably in a range of 0.1% by mass to 20% by mass.

—Metal Corrosion Inhibitor—

The fibrous conductive particles-containing layer preferably contains a metal corrosion inhibitor of the fibrous conductive particles such as metal nanowires. The metal corrosion inhibitor is not particularly limited and can be suitably selected according to the purposes. Thiols or azoles are suitable, for example.

When the metal corrosion inhibitor is contained, it is possible to exhibit an antirust effect and to prevent a decrease in heat insulating properties and transparency of the fibrous conductive particles-containing layer over time. The metal corrosion inhibitor can be applied by being added into a composition for forming the fibrous conductive particles-containing layer in a state of being suitably dissolved with a solvent or in a state of powder, or manufacturing a conductive film using a coating solution for a conductive layer which will be described later and then dipping the conductive film in a metal corrosion inhibitor bath.

In a case of adding the metal corrosion inhibitor, the content thereof in the fibrous conductive particles-containing layer is preferably from 0.5% by mass to 10% by mass with respect to the content of the fibrous conductive particles such as metal nanowires.

As the other matrix, the polymer compound of the dispersing agent used when preparing the fibrous conductive particles such as metal nanowires described above can be used as at least a part of components configuring the matrix.

—Other Conductive Material—

The fibrous conductive particles-containing layer may contain other conductive materials, for example, conductive particles, in addition to the fibrous conductive particles such as metal nanowires, within a range not degrading the effects of the invention. From a viewpoint of the effect, a content ratio of the fibrous conductive particles such as metal nanowires (preferably, metal nanowires having an aspect ratio equal to or greater than 10) is preferably equal to or greater than 50%, more preferably equal to or greater than 60%, and particularly preferably equal to or greater than 75%, based on volume, with respect to the total amount of the conductive material containing the fibrous conductive particles such as metal nanowires. When the content ratio of the fibrous conductive particles such as metal nanowires is 50%, a fine network of the fibrous conductive particles such as metal nanowires is formed and a fibrous conductive particles-containing layer having high conductivity can be easily formed.

The conductive particles other than the fibrous conductive particles such as metal nanowires may not significantly contribute to conductivity of the fibrous conductive particles-containing layer and may have absorption in a visible light region. It is particularly preferable that the conductive particles are metal and do not have a shape with strong plasmon absorption such as a spherical shape, from a viewpoint of not deteriorating transparency of the fibrous conductive particles-containing layer.

Here, a percentage of the fibrous conductive particles such as metal nanowires can be acquired as follows. For example, in a case where the fibrous conductive particles are silver nanowires and the conductive particles are silver particles, a silver nanowires aqueous dispersion is filtered to separate silver nanowires and other conductive particles, each of an amount of silver remaining on the filter paper and an amount of silver transmitted through the filter paper are measured by using a inductively coupled plasma (ICP) emission analysis device, and the percentage of the metal nanowires can be calculated. The aspect ratio of the fibrous conductive particles such as metal nanowires is calculated by observing the fibrous conductive particles such as metal nanowires remaining on the filter paper using a TEM and measuring each of short axis lengths and long axis lengths of the fibrous conductive particles such as 300 metal nanowires.

The measurement method of the average long axis length and the average short axis length of the fibrous conductive particles such as metal nanowires are as described above.

(Manufacturing Method of Fibrous Conductive Particles-Containing Layer)

A manufacturing method of the fibrous conductive particles-containing layer is not particularly limited. In the preferred embodiment, as a method of forming the fibrous conductive particles-containing layer on a support, the fibrous conductive particles-containing layer can be manufactured by a method at least containing: forming a liquid film by applying a liquid composition (hereinafter, also referred to as a "sol-gel coating solution) containing the fibrous conductive particles such as metal nanowires having an average short axis length equal to or smaller than 150 nm and the specified alkoxide compound so that the mass ratio thereof (that is, (content of specified alkoxide compound)/ (content of metal nanowires)) is in a range of 0.25/1 to 30/1 or the content molar ratio of the element (b) derived from the specified alkoxide compound and the metal element (a) derived from the metal nanowires is in a range of 0.10/1 to 22/1, on a support; and forming a fibrous conductive particles-containing layer by allowing a reaction such as hydrolysis and polycondensation of the specified alkoxide compound in the liquid film (hereinafter, this reaction such as hydrolysis and polycondensation is also referred to as a "sol-gel reaction"). This method may or may not further include evaporating (drying) performed by heating water contained in the liquid composition as a solvent, if necessary.

In the embodiment, by using the sol-gel coating solution, an aqueous dispersion of metal nanowires is prepared or the metal nanowires and the specified alkoxide compound may be mixed to prepare an aqueous dispersion. In the embodiment, an aqueous solution containing the specified alkoxide compound is prepared, this aqueous solution is heated, at least some parts of the specified alkoxide compound are subjected to hydrolysis and polycondensation to set a sol state, and the aqueous solution in the sol state and the aqueous dispersion of metal nanowires may be mixed to prepare a sol-gel coating solution.

In order to promote a sol-gel reaction, it is practically preferable to use an acid catalyst or a basic catalyst together, in order to improve reaction efficiency.

—Solvent—

The liquid composition may contain water and/or an organic solvent, if necessary. By containing an organic solvent, a more uniform liquid film can be formed on the support.

Examples of such an organic solvent include a ketone-based solvent such as acetone, methyl ethyl ketone, or diethyl ketone, an alcohol-based solvent such as methanol, ethanol, 2-propanol, 1-propanol, 1-butanol, or tert-butanol, a chlorine-based solvent such as chloroform or methylene chloride, an aromatic solvent such as benzene or toluene, an ester-based solvent such as ethyl acetate, butyl acetate, or isopropyl acetate, an ether-based solvent such as diethyl ether, tetrahydrofuran, or dioxane, and a glycol ether-based solvent such as ethylene glycol monomethyl ether or ethylene glycol dimethyl ether. In a case where the liquid composition contains the organic solvent, the content thereof is preferably in a range of equal to or smaller than 50% by mass and more preferably in a range of equal to or smaller than 30% by mass, with respect to the total mass of the liquid composition.

A reaction such as hydrolysis and polycondensation of the specified alkoxide compound occurs in the coating liquid film of the sol-gel coating solution formed on the support, and in order to promote the reaction, it is preferable that the coating liquid film is heated and dried. A heating temperature for promoting the sol-gel reaction is suitably in a range of 30° C. to 200° C. and more preferably in a range of 50° C. to 180° C. The heating and drying time is preferably from 10 seconds to 300 minutes and more preferably from 1 minute to 120 minutes.

—Formation Method of Fibrous Conductive Particles-Containing Layer—

A method of forming the fibrous conductive particles-containing layer described above on the support is not particularly limited. General coating methods can be used and any method can be suitably selected according to the purpose. Examples thereof include a roll coating method, a bar coating method, a dip coating method, a spin coating method, a casting method, a die coating method, a blade coating method, a gravure coating method, a curtain coating method, a spray coating method, and doctor coating method.

<Interlayer>

It is preferable that the heat insulating window film includes at least one interlayer between the support and the fibrous conductive particles-containing layer. When the interlayer is provided between the support and the fibrous conductive particles-containing layer, at least one of adhesiveness between the support and the fibrous conductive particles-containing layer, visible light transmittance of the fibrous conductive particles-containing layer, the haze of the fibrous conductive particles-containing layer, or film strength of the fibrous conductive particles-containing layer can be improved.

As the interlayer, an adhesive layer for improving adhesiveness between the support and the fibrous conductive particles-containing layer or a functional layer for improving functionality with interaction with a component contained in the fibrous conductive particles-containing layer is used, and the interlayer is suitably selected according to the purpose.

A configuration of the heat insulating window film further including the interlayer will be described with reference to the drawing.

In FIG. 1, the fibrous conductive particles-containing layer 20 is provided on the adhesive layer-attached support 101 which is forming by providing the interlayer (first adhesive layer 31 and second adhesive layer 32) on the support. The interlayer including the first adhesive layer 31 having excellent affinity with the support 10 and the second adhesive layer 32 having excellent affinity with fibrous conductive particles-containing layer 20 is provided between the support 10 and the fibrous conductive particles-containing layer 20.

An interlayer having a configuration other than that of FIG. 1 may be provided, and for example, it is also preferable that an interlayer including a functional layer adjacent to the fibrous conductive particles-containing layer 20 is provided between the support 10 and the fibrous conductive particles-containing layer 20, in addition to the first adhesive layer 31 and the second adhesive layer 32 which are the same as those in the first embodiment (not shown).

A material used for the interlayer is not particularly limited and materials for improving at least any one of the properties described above may be used.

For example, in a case of including the adhesive layer as the interlayer, materials selected from a polymer used in an adhesive, a silane coupling agent, a titanium coupling agent, and a sol-gel film obtained by allowing hydrolysis and polycondensation of the alkoxide compound of Si are contained in the adhesive layer.

It is preferable that the interlayer adjacent to the fibrous conductive particles-containing layer (that is, in a case where the interlayer is a single layer, the interlayer adjacent to the fibrous conductive particles-containing layer, and in a case where the interlayer includes a plurality of sub-interlayers, the sub-interlayer adjacent to the fibrous conductive particles-containing layer) is a functional layer including a compound including a functional group (hereinafter, referred to as "interaction-capable functional group") capable of allowing electrostatic interaction with the fibrous conductive particles such as metal nanowires contained in the fibrous conductive particles-containing layer 20, because a fibrous conductive particles-containing layer having excellent visible light transmission, haze, and film strength is obtained. In a case of including such an interlayer, even when the fibrous conductive particles-containing layer 20 includes the fibrous conductive particles such as metal nanowires and the organic polymer, a fibrous conductive particles-containing layer having excellent film strength is obtained.

Although the reason is not clear, when the interlayer including a compound including the interaction-capable functional group with the fibrous conductive particles such as metal nanowires contained in the fibrous conductive particles-containing layer 20 is provided, aggregation of the conductive materials of the fibrous conductive particles-containing layer is prevented, even dispersibility is improved, a decrease in transparency haze caused by the aggregation of the conductive materials of the fibrous conductive particles-containing layer is prevented, and the improvement of film strength due to adhesiveness is achieved, due to the interaction between the fibrous conductive particles such as metal nanowires contained in the fibrous conductive particles-containing layer and the compound including functional group described above contained in the interlayer. The interlayer which can exhibit such interaction may be referred to as a functional layer, hereinafter. The functional layer exhibits the effects described above by allowing the interaction with the fibrous conductive particles such as metal nanowires. Accordingly, when the fibrous conductive particles-containing layer contains the fibrous conductive particles such as metal nanowires, the effects described above are realized without depending on the matrix contained in the fibrous conductive particles-containing layer.

In a case where the fibrous conductive particles such as metal nanowires are silver nanowires, for example, examples of the interaction-capable functional group with the fibrous conductive particles such as metal nanowires include an amido group, an amino group, a mercapto group, a carboxylic acid group, a sulfonic acid group, a phosphoric acid group, and a phosphonic acid group or salt thereof, and a compound containing one or a plurality of functional groups selected from these is more preferable. As the functional group, an amino group, a mercapto group, a phosphoric acid group, and a phosphonic acid group or salt thereof are more preferable and an amino group is even more preferable.

Examples of the compound including the functional group include compounds including an amido group such as ureidopropyltriethoxysilane, polyacrylamide, or polymethacrylamide, compounds including an amino group such as N-β(aminoethyl) γ-aminopropyltrimethoxysilane, 3-aminopropyltriethoxysilane, bis(hexamethylene)triamine, N,N'-bis(3-aminopropyl)-1,4-butanediamine tetrahydrochloride, spermine, diethylenetriamine, m-xylenediamine, or metaphenylene diamine, compounds including a mercapto group such as 3-mercaptopropyltrimethoxysilane, 2-mercaptobenzothiazole, or toluene-3,4-dithiol, compounds including a group of sulfonic acid or salt thereof such as poly(sodium para-styrene sulfonate), or poly(2-acrylamido-2-methylpropane sulfonate), compounds including a carboxylic acid group such as polyacrylic acid, polymethacrylic acid, polyaspartic acid, terephthalic acid, cinnamic acid, fumaric acid, or succinic acid, compounds including a phosphoric acid group such as PHOSMER PE, PHOSMER CL, PHOSMER M, and PHOSMER MH (product name, manufactured by Uni-Chemical Co., Ltd.) and polymers thereof, POLYPHOSMER M-101, POLYPHOSMER PE-201, and POLYPHOSMER MH-301 (product name, manufactured by DAP Co., Ltd.), and compounds including a phosphonic acid group such as phenylphosphonic acid, decylphosphonic acid, methylene diphosphonic acid, vinylphosphonic acid, or allylphosphonic acid.

By selecting these functional groups, aggregation of the fibrous conductive particles such as metal nanowires is prevented when applying a coating solution for forming a fibrous conductive particles-containing layer and allowing interaction between the fibrous conductive particles such as metal nanowires and the functional groups contained in the interlayer and drying, and a fibrous conductive particles-containing layer in which the fibrous conductive particles such as metal nanowires are uniformly dispersed can be formed.

The interlayer can be formed by applying liquid obtained by dissolving, dispersing, or emulsifying compounds configuring the interlayer on the support and drying the liquid, and general methods can be used as the application method. The method thereof is not particularly limited and can be suitably selected according to the purpose. Examples thereof include a roll coating method, a bar coating method, a dip coating method, a spin coating method, a casting method, a die coating method, a blade coating method, a gravure coating method, a curtain coating method, a spray coating method, and doctor coating method.

Protective Layer

The heat insulating window film may include a protective layer (reference numeral 21 in FIG. 1) on the fibrous conductive particles-containing layer (reference numeral 20 in FIG. 1). The protective layer is not particularly limited and is preferably has excellent abrasion resistance.

<Near Infrared Shielding Material>

Examples of the near infrared shielding material include plate-shaped metal particles (for example, silver nanodiscs), an organic multilayer film, and spherical metal oxide particles (for example, tin-doped indium oxide (indium tin oxide; ITO) particles, antimony-doped tin oxide (antimony tin oxide; ATO) particles, cesium-doped tungsten oxide (CWO) particles).

A near infrared shielding layer is preferably formed by using the near infrared shielding materials.

(Near Infrared Shielding Layer Using Plate-Shaped Metal Particles)

From a viewpoint of heat ray shielding properties (solar heat gain coefficient), a heat ray reflection type which does not cause re-radiation is desirable, compared to a heat ray absorption type in which re-radiation of absorbed light into a room (approximately ⅓ amount of solar radiation energy absorbed) is performed. From a viewpoint of reflection of near infrared ray, plate-shaped metal particles are preferably used as the near infrared shielding material. In the near infrared shielding layer using the plate-shaped metal particles, near infrared shielding materials disclosed in paragraphs "0019" to "0046" of JP2013-228694A, JP2013-083974A, JP2013-080222A, JP2013-080221A, JP2013-077007A, and JP2013-068945A can be used and the description in these documents is incorporated in this specification.

Specifically, the near infrared shielding layer is a layer containing at least one kind of metal particles, and the metal particles preferably contain 60% by number or more of plate-shaped metal particles having a hexagonal or circular shape, and the principal plane of the plate-shaped metal particles having a hexagonal or circular shape is preferably plane-oriented in a range of averagely 0° to ±30° with respect to one surface of the near infrared shielding layer.

The metal particles are not particularly limited, as long as metal particles contains 60% by number or more of plate-shaped metal particles having a hexagonal or circular shape and the principal plane of the plate-shaped metal particles having a hexagonal or circular shape is plane-oriented in a range of averagely 0° to ±30° with respect to one surface of the near infrared shielding layer, and can be suitably selected according to the purpose.

A material of the metal particles is not particularly limited and can be suitably selected according to the purpose. Preferable examples thereof include silver, gold, aluminum, copper, rhodium, nickel, and platinum, from a viewpoint of high reflectivity of heat rays (near infrared rays).

—Plate-Shaped Metal Particles—

The plate-shaped metal particles are not particularly limited as long as the plate-shaped metal particles have two principal plane and can be suitably selected according to the purpose. The shape thereof is a hexagonal shape, a circular shape, or a triangular shape. Among these, the plate-shaped metal particles more preferably have a hexagonal or more polygonal shape or a circular shape and particularly preferably have a hexagonal shape or a circular shape, from a viewpoint of high visible light transmittance.

A material of the plate-shaped metal particles is not particularly limited and the same material as that of the metal particles can be suitably selected according to the purpose. The plate-shaped metal particles preferably contain at least silver.

A method of evaluating whether or not the principal plane of the plate-shaped metal particles is plane-oriented with respect to one surface of the near infrared shielding layer (surface of support) is not particularly limited and can be suitably selected according to the purpose. For example, a method of preparing an appropriate cross section piece and performing the evaluation by observing the near infrared shielding layer (surface of support) and the plate-shaped metal particles of this piece may be used. Specifically, a method of preparing a cross section sample or a cross section piece sample of the near infrared shielding layer by using a microtome or a focused ion beam (FIB) and performing an evaluation from an image obtained by observing the sectional shape or the sectional piece sample by using various microscope (for example, field emission scanning electron microscope (FE-SEM)) is used.

A plasmon resonance wavelength $\lambda$ of metal configuring the plate-shaped metal particles of the near infrared shielding layer is not particularly limited and can be suitably selected according to the purpose. The plasmon resonance wavelength thereof is preferably from 400 nm to 2,500 nm from a viewpoint of imparting heat ray reflection performance, and is more preferably from 700 nm to 2,500 nm from a viewpoint of imparting visible light transmittance.

—Medium of Near Infrared Shielding Layer—

A medium of the near infrared shielding layer is not particularly limited and can be suitably selected according to the purpose. The near infrared shielding layer preferably contains polymers and more preferably contains transparent polymers. Examples of polymers include polymers such as a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, and natural polymer such as gelatin and cellulose. Among these, in the invention, the main polymer of the polymer is preferably a polyvinyl alcohol resin, a polyvinyl butyral resin, a polyvinyl chloride resin, a (saturated) polyester resin, and a polyurethane resin, more preferably a polyester resin, and a polyurethane resin, in order to easily make 80% by number or more plate-shaped metal particles having a hexagonal or circular shape present in a range of d/2 from the surface of the near infrared shielding layer, and particularly preferably a polyester resin, in order to further improve rubbing resistance of a heat ray shielding layer of the invention. The main polymer of the polymer contained in the near infrared shielding layer is referred to as a polymer component occupying 50% by mass or more of polymer contained in the near infrared shielding layer.

A refractive index n of the medium is preferably from 1.4 to 1.7.

Thickness of Near Infrared Shielding Layer

In a thickness d of the near infrared shielding layer, when a thickness of metal particles is set as a and an average particle diameter (average equivalent circle diameter) is set as b, it is preferable to satisfy a relationship of $a/2 \leq d \leq 2b$ and it is more preferable to satisfy a relationship of $a \leq d \leq b$.

—Synthesis Method of Plate-Shaped Metal Particles—

A synthesis method of the plate-shaped metal particles is not particularly limited as long as plate-shaped metal particles having a hexagonal or circular shape are obtained, and can be suitably selected according to the purpose. Examples thereof include liquid phase methods such as a chemical reduction method, a photochemical reduction method, and an electrochemical reduction method. Among these, liquid phase methods such as a chemical reduction method and a photochemical reduction method are particularly preferable, from a viewpoint of controllability of a shape and a size. After the synthesis of the plate-shaped metal particles having a hexagonal or triangular shape, etching treatment using dissolving elements for dissolving silver such as nitric acid or sodium sulfite or etching treatment using heating is performed to get blunt angles of the plate-shaped metal particles having a hexagonal or triangular shape, and the plate-shaped metal particles having a hexagonal or circular shape may be obtained.

—Adding Various Additives—

An antioxidant such as mercaptotetrazole or ascorbic acid may be adsorbed to the plate-shaped metal particles, in order to prevent oxidation of metal such as silver configuring the plate-shaped metal particles. An oxidation sacrificing layer formed of Ni or the like may be formed on the surface of the plate-shaped metal particles in order for oxidation prevention. In addition, the plate-shaped metal particles may be coated with a metal oxide film such as $SiO_2$, in order to shield oxygen.

A dispersing agent such as a low-molecular dispersing agent or a polymer dispersing agent containing at least any one of quarternary ammonium salt, N element such as amines, S element, or P element, for example, may be added to the plate-shaped metal particles, in order to impart dispersibility.

(Organic Multilayer Film and Spherical Metal Oxide Particles)

As the near infrared shielding layer using an organic multilayer film, a layer disclosed in paragraphs "0039" to "0044" of JP2012-256041A can be preferably used and the description in this document is incorporated in this specification.

As the near infrared shielding layer using spherical metal oxide particles, layers disclosed in paragraphs "0038" and "0039" of JP2013-37013A and paragraphs "0060" and "0061" of JP2013-228698A can be preferably used and the description in this document is incorporated in this specification.

<Pressure Sensitive Adhesive Layer>

The heat insulating window film of the invention preferably includes a pressure sensitive adhesive layer. The pressure sensitive adhesive layer can contain an ultraviolet absorbing agent.

A material capable of being used for forming the pressure sensitive adhesive layer is not particularly limited and can be suitably selected according to the purpose. Examples thereof include a polyvinyl butyral resin, an acrylic resin, a styrene/acrylic resin, a urethane resin, a polyester resin, and silicone resin. These may be used alone or in combination of two or more kinds thereof. The pressure sensitive adhesive layer formed of these materials can be formed by coating.

As the ultraviolet absorbing agent, a material disclosed in paragraphs "0041" to "0046" of JP2012-215811A can be preferably used and the description in this document is incorporated in this specification.

In addition, an antistatic agent, a lubricant, or an anti-blocking agent may be added to the pressure sensitive adhesive layer.

A thickness of the pressure sensitive adhesive layer is preferably from 0.1 µm to 10 µm.

[Heat Insulating Window Glass and Window]

The heat insulating window glass of the invention is a heat insulating window glass obtained by laminating the heat insulating window film of the invention and a glass.

The window of the invention is a window including a transparent window support and the heat insulating window film of the invention bonded to the transparent window support.

As the transparent window support, a transparent window support having a thickness equal to or greater than 0.5 mm is preferable, a transparent window support having a thickness equal to or greater than 1 mm is more preferable, and from a viewpoint of preventing thermal conduction due to the thickness of the transparent window support and increasing warmth, a transparent window support having a thickness equal to or greater than 2 mm is particularly preferable.

In general, a plate-shaped or a sheet-shaped material is used as the transparent window support.

Examples of the transparent window support include transparent glass such as white plate glass, blue plate glass, or silica-coated blue plate glass; a synthetic resin such as polycarbonate, polyether sulfone, polyester, an acrylic resin, a vinyl chloride resin, an aromatic polyamide resin, polyamide imide, or polyimide; metal such as aluminum, copper, nickel, or stainless steel; ceramic; and a silicon wafer used in a semiconductor substrate. Among these, the transparent window support is preferably glass or a resin plate and more preferably glass.

Components configuring glass or window glass are not particularly limited, and transparent glass such as white plate glass, blue plate glass, or silica-coated blue plate glass can be used as the glass or the window glass, for example.

The glass used in the invention preferably has a smooth surface and is preferably float glass.

When acquiring visible light transmittance of the heat insulating window glass of the invention, it is preferable to perform the measurement by bonding the heat insulating window film of the invention to a blue plate glass having a thickness of 3 mm. As the blue plate glass having a thickness of 3 mm, a glass disclosed in JISA5759 is preferably used.

The heat insulating window film of the invention is bonded to the inner side of the window, that is, the indoor side of the window glass.

In the heat insulating window glass of the invention or the window of the invention, the fibrous conductive particles-containing layer of the heat insulating window film of the invention is disposed on the surface of the support on a side opposite to the surface of the window (glass or transparent window support) side. In the invention, although the heat insulating properties are dependent on the thickness of the fibrous conductive particles-containing layer, a distance between the fibrous conductive particles-containing layer and the outermost surface on the indoor side is preferably within 1 µm, from a viewpoint of increasing heat insulating properties, and more preferably within 0.5 µm.

In addition, the fibrous conductive particles-containing layer is preferably the outermost layer or the second outermost layer on the indoor side, from a viewpoint of increasing heat insulating properties, and more preferably the outermost layer on the indoor side.

<Evaluation of Interlayer Distance>

An evaluation method of the distance between the fibrous conductive particles-containing layer and the outermost surface on the indoor side is not particularly limited and can be suitably selected according to the purpose. For example, a method of preparing an appropriate sectional piece and performing the evaluation by observing the fibrous conductive particles-containing layer and the outermost surface on the indoor side of this piece may be used. Specifically, a method of preparing a cross section sample or a cross section piece sample of the heat insulating window film by using a microtome or a focused ion beam (FIB) and performing an evaluation from an image obtained by observing the cross section sample or the cross section piece sample by using various microscope (for example, field emission scanning electron microscope (FE-SEM)) is used.

In the heat insulating window glass of the invention or the window of the invention, it is preferable that the near infrared shielding layer is installed on a sunlight side as possible, because infrared rays to be incident to the room can be reflected in advance, and from this viewpoint, the pressure sensitive adhesive layer is preferably laminated so that the near infrared shielding layer is installed on a sunlight incident side. Specifically, it is preferable that the pressure sensitive adhesive layer is provided on the near infrared shielding layer or the functional layer such as an overcoat layer provided on the near infrared shielding layer and the near infrared shielding layer is bonded to the window glass through this pressure sensitive adhesive layer.

When bonding the heat insulating window film of the invention to the window glass, the heat insulating window film of the invention in which the pressure sensitive adhesive layer is provided by coating or laminating is prepared, an aqueous solution containing a surfactant (mainly anionic) is sprayed to the surface of the window glass or the surface of the pressure sensitive adhesive layer of the heat insulating window film of the invention in advance, and the heat insulating window film of the invention may be installed on the window glass through the pressure sensitive adhesive layer. The pressure sensitive adhesiveness of the pressure sensitive adhesive layer decreases while moisture is evaporated, and accordingly, the position of the heat insulating window film of the invention can be adjusted on the glass surface. After determining the bonding position of the heat insulating window film of the invention to the window glass, the moisture remaining between the window glass and the heat insulating window film of the invention is swept from the center to the edge of the glass by using a squeegee or the like, and accordingly, the heat insulating window film of the invention can be fixed to the surface of the window glass. By doing so, the heat insulating window film of the invention can be installed on the window glass.

[Building Material, Building, and Vehicles]

The usage of the heat insulating window film, the heat insulating window glass, and the glass of the invention is not particularly limited and can be suitably selected according to the purposes. For example, the heat insulating window film, the heat insulating window glass, and the glass are used for vehicles, for building materials or buildings, and for agriculture. Among these, the heat insulating window film, the heat insulating window glass, and the glass are preferably used in building materials, buildings, and vehicles, from a viewpoint of energy saving effects.

The building material of the invention is a building material including the heat insulating window film of the invention or the heat insulating window glass of the invention.

The building of the invention is a building including the heat insulating window film of the invention, the heat insulating window glass of the invention, the building material of the invention, or the window of the invention. Examples of the building include a house, an office building, and a warehouse.

The vehicle of the invention is a vehicle including the heat insulating window film of the invention, the heat insulating window glass of the invention, or the window of the invention. Examples of the vehicle include a car, a railway vehicle, and a ship.

EXAMPLES

Hereinafter, the embodiments of the invention will be described more specifically with reference to the examples and comparative examples. The materials, the usage amount, the ratio, the process content, and the process procedure shown in the following examples can be suitably changed within a range not departing from the gist of the invention. Therefore, the ranges of the invention is not narrowly interpreted based on the specific examples shown below.

Preparation Example 1

Measurement Method of Average Short Axis Length (Average Diameter) and Average Long Axis Length of Metal Nanowires Short axis lengths (diameters) and long axis lengths of 300 metal nanowires randomly selected from the metal nanowires which were enlarged and observed by using a transmission electron microscope (TEM; product name: JEM-2000FX manufactured by JEOL, Ltd.) were measured, and an average short axis length (average diameter) and an average long axis length of the metal nanowires were acquired from the average value thereof <Measurement Method of Coefficient of Variation of Short Axis Lengths (Diameters) of Metal Nanowires>

The short axis lengths (diameters) of 300 nanowires randomly selected from the transmission electron microscope (TEM) image were measured and a standard deviation and an average value of 300 nanowires were calculated to acquire a coefficient of variation. The coefficient of variation was acquired by dividing the value of the standard deviation by the average value.

<Preparation of Silver Nanowire Aqueous Dispersion (1)>

The following liquid additives A, G, and H were prepared in advance.

(Liquid Additive A)

5.1 g of silver nitrate powder was dissolved in 500 mL of pure water. After that, 1 mol/L of ammonia water was added thereto until a transparent material was obtained. Pure water was added so that the total amount of the mixture becomes 100 mL.

(Liquid Additive G)

1 g of glucose powder was dissolved in 280 mL of pure water to prepare a liquid additive G.

(Liquid Additive H)

4 g of hexadecyl-trimethylammoniumbromide powder was dissolved in 220 mL of pure water to prepare a liquid additive H.

Next, a silver nanowire aqueous dispersion (1) was prepared as follows.

410 mL of pure water was put in a three-necked flask, and 82.5 mL of the liquid additive H and 206 mL of the liquid additive G were added through a funnel while stirring the solution at 20° C. (first stage). 206 mL of the liquid additive A was added to this solution at a flow rate of 2.0 mL/min and a stirring rotation rate of 800 rpm (round per minute) (second stage). After 10 minutes, 82.5 mL of the liquid additive H was added (third stage). Then, the internal temperature was increased to 73° C. at a rate of 3° C./min.

After that, the stirring rotation rate was decreased to 200 rpm and the solution was heated for 5.5 hours. The obtained aqueous dispersion was cooled.

An ultrafiltration module SIP 1013 (product name, manufactured by Asahi Kasei Corporation, molecular weight cutoff: 6,000), a magnet pump, and a stainless steel cup were connected to each other through silicone tubes to prepare an ultrafiltration device.

The cooled aqueous dispersion described above was put into the stainless steel cup of the ultrafiltration device and the pump was operated to perform ultrafiltration. 950 mL of distilled water was added into the stainless steel cup and washing was performed, when the amount of a filtrate from the ultrafiltration module has become 50 mL. The washing described above was repeatedly performed until electric conductivity (measured by CM-25R manufactured by DKK-TOA Corporation) has become equal to or smaller than 50 µS/cm, and then, the concentration was performed to obtain 0.84% silver nanowire aqueous dispersion (1). The obtained silver nanowire aqueous dispersion (1) was set as a silver nanowire aqueous dispersion of Preparation Example 1. An average short axis length and an average long axis length of silver nanowires contained in the silver nanowire aqueous dispersion of Preparation Example 1 obtained and a coefficient of variation of short axis lengths of the silver nanowires were measured as described above. As a result, it was found that the silver nanowires having an average short axis length of 17.2 nm, an average long axis length of 34.2 µm, and a coefficient of variation of 17.8% were obtained. Hereinafter, the "silver nanowire aqueous dispersion (1)" indicates the silver nanowire aqueous dispersion obtained by the method described above.

Preparation Example 2

Preparation of Adhesive Layer-Attached Support
(PET Substrate; Reference Numeral 101 in FIG. 1)

A solution for adhesion 1 was prepared with the following combination.

(Solution for Adhesion 1)

TAKELAC (registered trademark) WS-4000: 5.0 parts by mass (polyurethane for coating, solid content concentration of 30%, manufactured by Mitsui Chemicals)

Surfactant: 0.3 parts by mass (product name: NAROACTY HN-100 manufactured by Sanyo Chemical Industries)

Surfactant: 0.3 parts by mass (SANDET (registered trademark) BL, solid content concentration of 43%, manufactured by Sanyo Chemical Industries)

94.4 parts by mass

Corona discharge treatment was performed with respect to one surface of a PET film (reference numeral 10 in FIG. 1) having a thickness of 75 µm used as a support, and the solution for adhesion 1 was applied to the surface subjected to the corona discharge treatment and dried at 120° C. for 2 minutes to form a first adhesive layer having a thickness of 0.11 µm (reference numeral 31 of FIG. 1).

A solution for adhesion 2 was prepared with the following combination.

(Solution for Adhesion 2)

Tetraethoxysilane: 5.0 parts by mass (product name: KBE-04 manufactured by Shin-Etsu Chemical Co., Ltd.)

3-glycidoxypropyltrimethoxysilane: 3.2 parts by mass (product name: KBM-403 manufactured by Shin-Etsu Chemical Co., Ltd.)

2-(3,4-epoxycyclohexyl) ethyl trimethoxysilane: 1.8 parts by mass (product name: KBM-303 manufactured by Shin-Etsu Chemical Co., Ltd.)

Acetic acid aqueous solution (acetic acid concentration=0.05%, pH (power of Hydrogen)=5.2): 10.0 parts by mass Hardener: 0.8 parts by mass (boric acid manufactured by Wako Pure Chemical Industries, Ltd.)

Colloidal silica: 60.0 parts by mass (SNOWTEX (registered trademark) O, average particle diameter of 10 nm to 20 nm, solid content concentration of 20%, pH=2.6, manufactured by Nissan Chemical Industries, Ltd.)

Surfactant: 0.2 parts by mass (product name: NAROACTY HN-100 manufactured by Sanyo Chemical Industries)

Surfactant: 0.2 parts by mass (SANDET (registered trademark) BL, solid content concentration of 43%, manufactured by Sanyo Chemical Industries)

The solution for adhesion 2 was prepared by the following method. While vigorously stirring the acetic acid aqueous solution, 3-glycidoxypropyltrimethoxysilane was added dropwise into this acetic acid aqueous solution for 3 minutes. Next, 2-(3,4-epoxycyclohexyl) ethyl trimethoxysilane was added for 3 minutes while strongly stirring the acetic acid aqueous solution. Then, tetraethoxysilane was added for 5 minutes while strongly stirring the acetic acid aqueous solution, and stirring was continued for 2 hours. Next, colloidal silica, the hardener, and the surfactant were sequentially added to prepare the solution for adhesion 2.

The surface of the first adhesive layer (reference numeral 31 in FIG. 1) described above was subjected to corona discharge treatment, the solution for adhesion 2 described above was applied to this surface by a barcode method and heated and dried at 170° C. for 1 minute, and a second adhesive layer (reference numeral 32 in FIG. 1) having a thickness of 0.5 µm was formed to obtain an adhesive layer-attached support (PET substrate; reference numeral 101 in FIG. 1).

Preparation Example 3

Preparation of Silver Plate-Shaped Particle Dispersion B1

(Preparation of Silver Plate-Shaped Particle Dispersion A1)

13 L of ion exchange water was weighed in a reaction vessel made of NTKR-4 (manufactured by Nippon Metal Industry Co., Ltd.), 1.0 L of 10 g/L trisodium citrate (anhydride) aqueous solution was added and heated to 35° C., while stirring by using a chamber including an agitator obtained by attaching four propellers made of NTKR-4 and four paddles made of NTKR-4 to a shaft made of SUS316L. 0.68 L of 8.0 g/L polystyrene sulfonic acid aqueous solution was further added to the reaction vessel, and 0.041 L of sodium borohydride aqueous solution prepared to have 23 g/L by using 0.04 mol/L sodium hydroxide aqueous solution was further added. 13 L of 0.10 g/L silver nitrate aqueous solution was added into the reaction vessel at 5.0 L/min.

1.0 L of 10 g/L trisodium citrate (anhydride) aqueous solution and 11 L of ion exchange water were further added into the reaction vessel and 0.68 L of 80 g/L hydroquinone potassium sulfonate aqueous solution was further added. A stirring rate was increased to 800 rpm, 8.1 L of 0.10 g/L silver nitrate aqueous solution was further added into the reaction vessel at 0.95 L/min, and the temperature was decreased to 30° C.

8.0 L of 44 g/L methyl hydroquinone aqueous solution was further added into the reaction vessel, and then, the total amount of a gelatin aqueous solution at 40° C. prepared by the following method was added. The stirring rate was increased to 1200 rpm, and the total amount of silver sulfite white precipitate mixed solution prepared by the following method was added into the reaction vessel.

In a state where the pH change of the prepared solution was stopped, 5.0 L of 1 mol/L NaOH aqueous solution was further added into the reaction vessel at 0.33 L/min. After that, 0.18 L of 2.0 g/L 1-(meth-sulfophenyl)-5-mercaptotetrazole sodium aqueous solution (dissolved by adjusting pH to be 7.0±1.0 by using NaOH and citric acid (anhydride)) was further added into the reaction vessel, and 0.078 L of 70 g/L 1,2-benzisothiazolin-3-one (dissolved by adjusting the aqueous solution to be alkaline using NaOH) was further added. By doing so, the silver plate-shaped particle dispersion A1 was prepared.

—Preparation of Gelatin Aqueous Solution—

16.7 L of ion exchange water was weighed in a solution tank made of SUS316L. 1.4 kg of alkali-treated bovine bone gelatin (GPC weight average molecular weight of 200,000) subjected to deionization treatment was added while performing low speed stirring using an agitator made of SUS316L. 0.91 kg of alkali-treated bovine bone gelatin (GPC weight average molecular weight of 21,000) subjected to deionization treatment, proteinase treatment, and oxidation treatment using hydrogen peroxide was further added. After that, the temperature was increased to 40° C. and imbibition and dissolving of gelatin were performed at the same time so that the gelatin was completely dissolved. The obtained solution was set as a gelatin aqueous solution and was used in the preparation of the silver plate-shaped particle dispersion A1.

—Preparation of Silver Sulfite White Precipitate Mixed Solution—

8.2 L of ion exchange water was weighed in a solution tank made of SUS316L and 8.2 L of 100 g/L silver nitrate aqueous solution was added. While performing high speed stirring using an agitator made of SUS316L, 2.7 L of 140 g/L sodium sulfite aqueous solution was added in a short time and a mixed solution containing white precipitate of silver sulfite was prepared. The obtained mixed solution was set as the silver sulfite white precipitate mixed solution and used in the preparation of the silver plate-shaped particle dispersion A1. This mixed solution was prepared immediately before being used.

(Characteristics of Silver Plate-Shaped Particle Dispersion A1)

When the silver plate-shaped particle dispersion A1 was diluted with ion exchange water and optical absorption was measured by using a spectrophotometer (U-3500 manufactured by Hitachi, Ltd.), an absorption peak wavelength was 900 nm and a full width at half maximum was 270 nm.

In physical properties of the silver plate-shaped particle dispersion A1, pH at 25° C. was 9.4 (measured by KR5E manufactured by AS ONE Corporation), electric conductivity was 8.1 mS/cm (measured by CM-25R manufactured by DKK-TOA Corporation), and viscosity was 2.1 mPa·s (measured by SV-10 manufactured by A&D Company). The obtained silver plate-shaped particle dispersion A1 was accommodated in a 20 L UNION CONTAINER II type (made of low density polyethylene, selling agent: AS ONE Corporation) vessel and stored at 30° C.

(Desalinization and Redispersion of Plate-Shaped Metal Particle Dispersion)

800 g of the silver plate-shaped particle dispersion A1 was collected in a centrifugal tube and pH at 25° C. was adjusted to 9.2±0.2 by using 1 mol/L NaOH and/or 0.5 mol/L sulfuric acid. The silver plate-shaped particle dispersion A1 in the centrifugal tube was subjected to a centrifugal separation operation at 9000 rpm for 60 minutes at 35° C. by using a centrifugal separator (himac CR22 GIII, ANGLE ROTOR R9A manufactured by Hitachi Koki Co., Ltd.) and then 784 g of a supernatant was removed. 0.2 mmol/L NaOH aqueous solution was added to the precipitated silver plate-shaped particles to set total content of the dispersion as 400 g, and the mixture was hand-stirred by using a stirring rod to obtain coarse dispersion (desalinization treatment).

24 coarse dispersions were prepared by performing the same operation as described above to set total content of the dispersions as 9600 g and added and mixed in a tank made of SUS316L. In addition, 10 cm$^3$ of 10 g/L solution (diluted with a mixed solution of methanol:ion exchange water=1:1 (volume ratio)) of Pluronic 31R1 (manufactured by BASF) was added into the tank. The coarse dispersions in the tank was subjected to batch-type dispersion treatment (redispersion treatment) at 9000 rpm for 120 minutes by using AUTOMIXER 20 TYPE (stirring unit is HOMOGENIZING MIXER MARK II) manufactured by PRIMIX Corporation. The liquid temperature during the redispersion treatment was maintained at 50° C. After the redispersion treatment, the temperature of the redispersed solution in the tank was decreased to 25° C. and single-pass filtering was performed by using PROFILE II FILTER (product type MCY1001Y030H13 manufactured by Nihon Pall Ltd.).

By doing so, the desalinization and the redispersion treatment were performed with respect to the silver plate-shaped particle dispersion A1 to prepare a silver plate-shaped particle dispersion B1.

(Characteristics of Silver Plate-Shaped Particle Dispersion B1)

When spectral transmittance of the plate-shaped particle dispersion B1 was measured by using the same method in the case of the plate-shaped particle dispersion A1, results of an absorption peak wavelength and a full width at half maximum were substantially the same as those of the plate-shaped particle dispersion A1.

In physical properties of the plate-shaped particle dispersion B1, pH at 25° C. was 7.6, electric conductivity was 0.37 mS/cm, and viscosity was 1.1 mPa·s. The obtained silver plate-shaped particle dispersion B1 was accommodated in a 20 L UNION CONTAINER II type vessel and stored at 30° C.

Preparation Example 4

Preparation of Coating Solution M1 for Near Infrared Shielding Layer Containing Near Infrared Shielding Material Hereinafter, the preparation of a coating solution M1 for a near infrared shielding layer containing silver plate-shaped particles as a near infrared shielding material will be described. A raw material used in the preparation of the coating solution was used by performing suitable processing such as diluting the purchased raw material or obtaining a dispersoid.

(Preparation of Coating Solution M1 for Near Infrared Shielding Layer)

The coating solution M1 containing the silver plate-shaped particles as a near infrared shielding material was prepared with the following combination.

—Coating Solution M1—

Aqueous urethane resin: HYDRAN HW350

(manufactured by DIC, solid content of 30% by mass): 0.27 parts by mass

Silver plate-shaped particle dispersion B1: 10.24 parts by mass 1-(methylureidophenyl)-5-mercaptotetrazole (manufactured by Wako Pure Chemical Industries, Ltd., preparation of alkaline aqueous solution having solid content of 2% by mass): 0.61 parts by mass Surfactant A: LIPAL 870P (manufactured by LION Corporation, dilution of ion exchange water having solid content of 1% by mass): 0.96 parts by mass Surfactant B: NAROACTY CL-95

(manufactured by Sanyo Chemical Industries, dilution of ion exchange water having solid content of 1% by mass): 1.19 parts by mass Methanol: 30.00 parts by mass Distilled water: 50.73 parts by mass Examples 1

Formation of Fibrous Conductive Particles-Containing Layer by Coating

A solution of an alkoxide compound having the following composition was stirred at 60° C. for 1 hour and a uniform state was confirmed. The prepared solution was set as a sol-gel solution.

(Solution of Alkoxide Compound)

Tetraethoxysilane: 5.0 parts by mass (product name: KBE-04 manufactured by Shin-Etsu Chemical Co., Ltd.)

1% Acetic acid aqueous solution: 10.0 parts by mass

Distilled water: 4.0 parts by mass 2.09 parts by mass of the obtained sol-gel solution and 32.70 parts by mass of the silver nanowire aqueous dispersion (1) obtained in Preparation Example 1 were mixed with each other and diluted using the distilled water to obtain a sol-gel coating solution.

Corona discharge treatment was performed with respect to the surface of the second adhesive layer (reference numeral 32 in FIG. 1) of the adhesive layer-attached support (PET substrate; reference numeral 101 in FIG. 1), and the sol-gel coating solution was applied to the surface thereof so that the silver amount is 0.040 g/m$^2$ and the total solid content coating amount is 0.120 g/m$^2$ by using a barcode method. After that, the sol-gel coating solution was dried at 175° C. for 1 minute to allow a sol-gel reaction and a fibrous conductive particles-containing layer (reference numeral 20 in FIG. 1) was formed. By doing so, an unpatterned heat insulating member 1 (reference numeral 102 in FIG. 1) was obtained. A mass ratio of tetraethoxysilane (alkoxide compound)/silver nanowires of the fibrous conductive particles-containing layer was 2/1.

An average film thickness of the fibrous conductive particles-containing layer measured by using an electron microscope as described below was 0.028 μm.

(Measurement Method of Film Thickness and Interlayer Distance Using Electron Microscope)

The protective layer (reference numeral 21 in FIG. 1) formed of carbon and Pt was formed on the fibrous conductive particles-containing layer (reference numeral 20 in FIG. 1) of the heat insulating member (reference numeral 102 in FIG. 1).

Then, a slice having a width of approximately 10 μm and a thickness of approximately 100 nm was prepared in a focusing ion beam device (product name: FB-2100) manufactured by Hitachi, Ltd., the cross section of the fibrous conductive particles-containing layer was observed with a scanning transmission electron microscope (product name: HD-2300, applying voltage: 200 kV) manufactured by Hitachi, Ltd., film thicknesses of five portions of the fibrous conductive particles-containing layer were measured, and an average film thickness was calculated as the arithmetic average value thereof. The average film thickness was calculated by measuring only the thickness of the matrix portion not present in the metal nanowires. A distance between the five portions of the fibrous conductive particles-containing layer and the outermost surface on the indoor side was measured and an interlayer distance as was calculated as the arithmetic average value thereof. In a case where the fibrous conductive particles-containing layer is the outermost layer, the interlayer distance was 0 (μm).

An electron micrograph which is for observing the cross section of the fibrous conductive particles-containing layer with a scanning transmission electron microscope (product name: HD-2300, applying voltage: 200 kV) manufactured by Hitachi, Ltd. and which shows the state of the arrangement of the fibrous conductive particles is shown in FIG. 7.

<Formation of Near Infrared Shielding Layer by Coating>

The coating solution M1 for the near infrared shielding layer prepared in Preparation Example 4 was applied to a rear surface of the surface of the adhesive layer-attached support (PET substrate; reference numeral 101 in FIG. 1) where the fibrous conductive particles-containing layer is disposed by using a wire bar so as to have a volume of 10.6 cm$^3$/m$^2$, dried at 140° C., to provide a near infrared shielding layer (reference numeral 41 in FIG. 1) containing the silver plate-shaped particles as the near infrared shielding material. A thickness of the applied and dried near infrared shielding layer was 10 nm.

<Formation of Pressure Sensitive Adhesive Layer and Preparation of Heat Insulating Window Film>

A pressure sensitive adhesive material was bonded onto the near infrared shielding layer (reference numeral 41 in FIG. 1) of the adhesive layer-attached support (PET substrate; reference numeral 101 in FIG. 1) by the following method to form a pressure sensitive adhesive layer (reference numeral 51 in FIG. 1). PANACLEAN PD-S1 (pressure sensitive adhesive layer thickness of 25 μm) manufactured by PANAC Co., Ltd. was used as the pressure sensitive adhesive material, a peelable separator (silicone coat PET) of the pressure sensitive adhesive material was peeled off, and the adhesive material was bonded to the surface of the near infrared shielding layer containing the silver plate-shaped particles as a near infrared reflecting material.

The obtained laminate was set as a heat insulating window film of Example 1.

<Preparation of Heat Insulating Window Glass>

The other peelable separator (silicone coat PET) of the pressure sensitive adhesive material PD-S1 was peeled off from the pressure sensitive adhesive layer formed by the method described above, the adhesive layer was bonded to a plate glass (thickness of plate glass: blue plate glass having a thickness of 3 mm) which is soda-lime silicate by using a 0.5 mass % diluent of REAL PERFECT (manufactured by Lintec Corporation) which is film processing liquid, and a heat insulating window glass having a configuration shown in FIG. 1 was prepared. The obtained heat insulating window glass was set as a heat insulating window glass of Example 1.

Regarding the heat insulating window glass of Example 1, each of optical characteristics was evaluated by the following method. As the plate glass, glass which is obtained by wiping dirt by isopropyl alcohol and naturally drying was used, and at the time of bonding, pressure welding was performed at surface pressure of 0.5 kg/cm$^2$ by using a rubber roller in the environment of 25° C. and relative humidity of 65%.

Example 2

A heat insulating window film and a heat insulating window glass of Example 2 were prepared in the same manner as in Example 1, except for applying the sol-gel coating solution so that the silver amount of the fibrous conductive particles-containing layer is 0.020 g/m$^2$ and the total solid content coating amount is 0.060 g/m$^2$.

Example 3

A heat insulating window film and a heat insulating window glass of Example 3 were prepared in the same manner as in Example 1, except for applying the sol-gel coating solution so that the silver amount of the fibrous conductive particles-containing layer is 0.080 g/m$^2$ and the total solid content coating amount is 0.240 g/m$^2$.

Example 4

A heat insulating window film and a heat insulating window glass of Example 4 were prepared in the same manner as in Example 1, except for applying the sol-gel coating solution so that the silver amount of the fibrous conductive particles-containing layer is 0.160 g/m$^2$ and the total solid content coating amount is 0.480 g/m$^2$.

Example 5

A heat insulating window film and a heat insulating window glass of Example 5 were prepared in the same manner as in Example 1, except for applying the sol-gel coating solution so that the silver amount of the fibrous conductive particles-containing layer is 0.240 g/m$^2$ and the total solid content coating amount is 0.720 g/m$^2$.

Example 6

Figure 2:
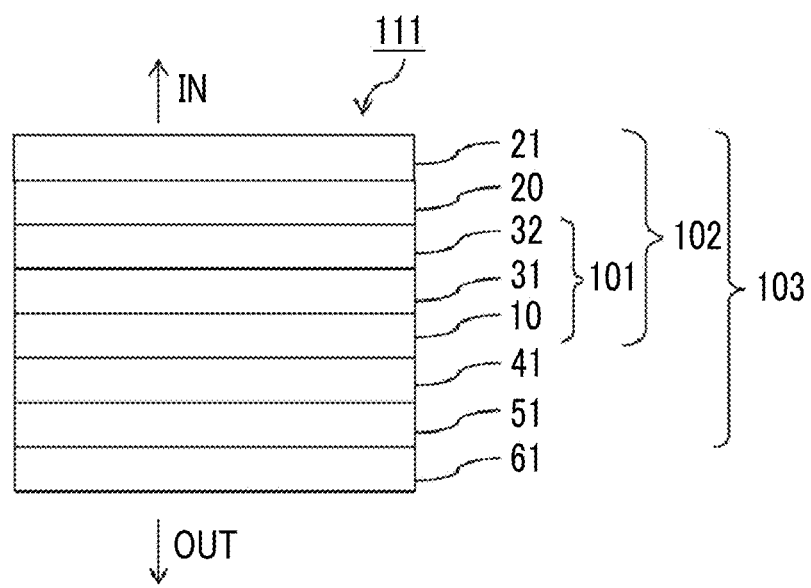
FIG. 2 is a schematic view showing a cross section of another example of the heat insulating window glass of the invention.

A heat insulating window film and a heat insulating window glass of Example 6 were prepared in the same manner as in Example 1, except for applying the solution for adhesion 2 prepared in Preparation Example 2 onto the fibrous conductive particles-containing layer 20 and further providing the protective layer (reference numeral 21 in FIG. 2) having a thickness of 0.5 μm as shown in FIG. 2.

Example 7

A heat insulating window film and a heat insulating window glass of Example 7 were prepared in the same manner as in Example 6, except for setting the thickness of the protective layer 21 as 0.8 μm.

Example 8

A heat insulating window film and a heat insulating window glass of Example 8 were prepared in the same manner as in Example 6, except for setting the thickness of the protective layer 21 as 1.2 μm.

Example 9

A heat insulating window film and a heat insulating window glass of Example 9 were prepared in the same manner as in Example 1, except for using a silver nanowire aqueous dispersion obtained by heating at 73° C. for 1 hour, instead of performing the heating at 73° C. for 5.5 hours in the preparation of the silver nanowire aqueous dispersion (1), instead of the silver nanowire aqueous dispersion (1) in Example 1. An average short axis length of the silver nanowires contained in the silver nanowire aqueous dispersion obtained in Example 9 was measured and shown in the following Table 1.

Example 10

A heat insulating window film and a heat insulating window glass of Example 10 were prepared in the same manner as in Example 1, except for using a silver nanowire aqueous dispersion obtained by performing the heating at 73° C. for 5.5 hours in the preparation of the silver nanowire aqueous dispersion (1) and further adding the liquid additive A (206 mL), the liquid additive G (206 mL), and the liquid additive H (82.5 mL), instead of the silver nanowire aqueous dispersion (1) in Example 1. An average short axis length of the silver nanowires contained in the silver nanowire aqueous dispersion obtained in Example 10 was measured and shown in the following Table 1.

Example 11

A heat insulating window film and a heat insulating window glass of Example 11 were prepared in the same manner as in Example 1, except for changing the near infrared shielding layer containing the silver plate-shaped particles into a near infrared shielding layer of an organic multilayer film prepared by the following method.

<Near Infrared Shielding Layer Using Organic Multilayer Film>

A "near infrared shielding layer using an organic multilayer film" which is formed by mutually laminating two types of polymer thin layers having different refractive indexes was prepared with the following procedure.

Polymethylmethacrylate (PMMA) was used as a polymer thin layer having a low refractive index and polyethylene terephthalate (PET) was used as a polymer thin layer having a high refractive index. The polymer thin layer having a low refractive index formed by using PMMA is referred to as a PMMA layer and the polymer thin layer having a high refractive index formed by using PET is referred to as a PET layer.

The PMMA layer was formed by applying liquid obtained by dissolving PMMA in 2-methoxyethyl acetate by a roll coat method. The refractive index thereof was 1.49.

The PET layer was formed by melting pellets of PET by an extruder and performing coating. The refractive index of the PET layer was 1.65.

The "near infrared shielding layer using an organic multilayer film" was prepared by alternately laminating 20 PMMA layers having a thickness of 0.144 μm and 20 PET layers having a thickness of 0.159 μm, alternately laminating 10 PMMA layers having a thickness of 0.165 μm and 10 PET layers having a thickness of 0.183 μm, alternately laminating 15 PMMA layers having a thickness of 0.187 μm and 15 PET layers having a thickness of 0.207 μm, alternately laminating 15 PMMA layers having a thickness of 0.158 μm and 15 PET layers having a thickness of 0.175 μm, and alternately laminating 15 PMMA layers having a thickness of 0.172 μm and 15 PET layers having a thickness of 0.191 μm. The polymer thin layers are 150 layers in total.

Comparative Example 1

Figure 3:
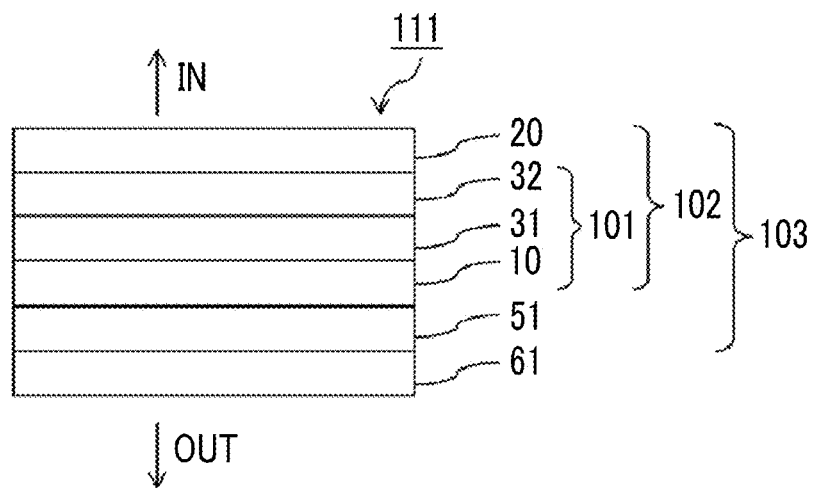
FIG. 3 is a schematic view showing a cross section of a heat insulating window glass of Comparative Example 1.

A heat insulating window film and a heat insulating window glass of Comparative Example 1 were prepared in the same manner as in Example 1, except for forming the near infrared shielding layer by coating. A layer configuration of the heat insulating window glass of Comparative Example 1 is shown in FIG. 3.

Comparative Example 2

Figure 4:
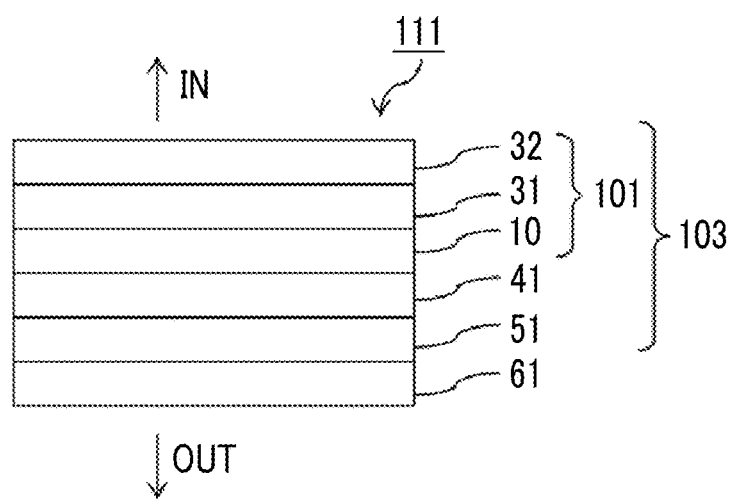
FIG. 4 is a schematic view showing a cross section of a heat insulating window glass of Comparative Example 2.

A heat insulating window film and a heat insulating window glass of Comparative Example 2 were prepared in the same manner as in Example 1, except for forming the fibrous conductive particles-containing layer by coating. A layer configuration of the heat insulating window glass of Comparative Example 2 is shown in FIG. 4.

Comparative Example 3

A PET film having a thickness of 75 μm (reference numeral 10 in FIG. 5) as a support, a titanium oxide layer having a thickness of 30 nm (reference numeral 71 in FIG. 5), a silver layer having a thickness of 17 nm (reference numeral 72 in FIG. 5), and a titanium oxide layer having a thickness of 28 nm (reference numeral 73 in FIG. 5) were sequentially laminated to obtain a laminate having selective optical transparency. Each layer was prepared by using a vacuum sputtering method.

Figure 5:
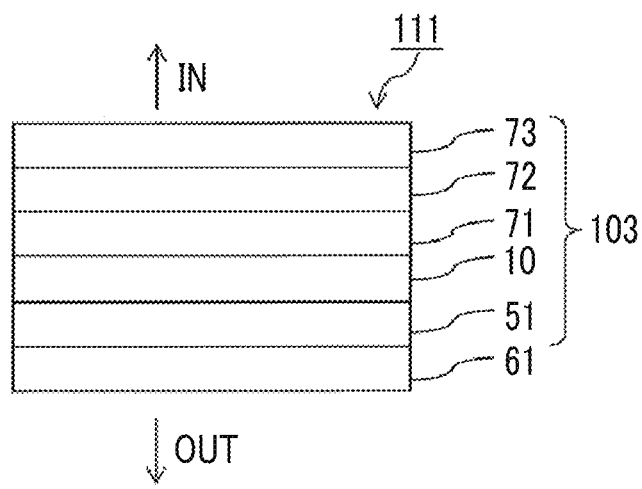
FIG. 5 is a schematic view showing a cross section of a heat insulating window glass of Comparative Example 3.

The glass (reference numeral 61 in FIG. 5) was bonded to the PET film surface of the obtained laminate having selective optical transparency through the pressure sensitive adhesive layer (reference numeral 51 in FIG. 5) in the same manner as in Example 1, to prepare a heat insulating window film and a heat insulating window glass of Comparative Example 3 were prepared. A layer configuration of the heat insulating window glass of Comparative Example 3 is shown in FIG. 5.

Comparative Example 4

Figure 6:
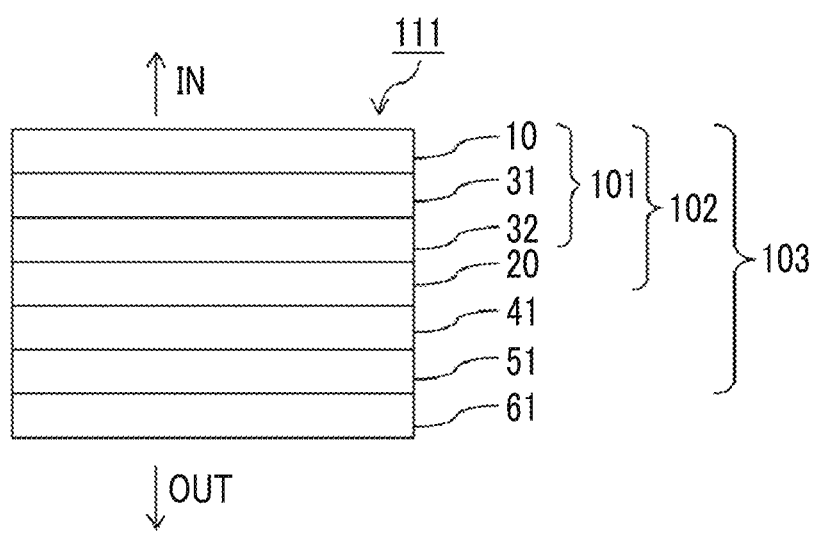
FIG. 6 is a schematic view showing a cross section of a heat insulating window glass of Comparative Example 4.

A heat insulating window film and a heat insulating window glass of Comparative Example 4 were prepared in the same manner as in Example 1, except for providing the near infrared shielding layer (reference numeral 41 in FIG. 6) on the fibrous conductive particles-containing layer (reference numeral 20 in FIG. 6) of the adhesive layer-attached support (PET substrate; reference numeral 101 in FIG. 6), providing the pressure sensitive adhesive layer (reference numeral 51 in FIG. 6) thereon, and bonding the adhesive layer to the glass (reference numeral 61 in FIG. 6), instead of providing the near infrared shielding layer, the pressure sensitive adhesive layer, and the glass on the rear surface of the surface of the adhesive layer-attached support (PET substrate; reference numeral 101 in FIG. 1) where the fibrous conductive particles-containing layer is disposed (support; reference numeral 10 in FIG. 1). A layer configuration of the heat insulating window glass of Comparative Example 4 is shown in FIG. 6.

[Evaluation]

(1) Light Visible Transmittance

Transmission spectra of heat insulating window glass materials prepared in Examples and Comparative Examples were measured by using a ultraviolet-visible near infrared spectroscope (manufactured by JASCO Corporation, V-670, integrating sphere unit ISN-723) and visible light transmittance was calculated based on ITS R 3106 and JIS A 5759.

In the heat insulating window film of the invention, it is practically necessary that the visible light transmittance in a case of bonding the heat insulating window film to the blue plate glass having a thickness of 3 mm (heat insulating window glass material of Examples and Comparative Examples) is equal to or greater than 70%, and the visible light transmittance of the heat insulating window film of the invention is preferably in a case of bonding the heat insulating window film to the blue plate glass having a thickness of 3 mm is preferably equal to or greater than 80% and more preferably equal to or greater than 85%.

(2) Shielding Properties for Near Infrared Ray (Average Value of Transmittance at Wavelength of 900 nm to 1100 nm)

Transmission spectra of heat insulating window glass materials prepared in Examples and Comparative Examples were measured by using a ultraviolet-visible near infrared spectroscope (manufactured by JASCO Corporation, V-670, integrating sphere unit ISN-723) and an average of transmittance at a wavelength of 900 nm to 1100 nm was acquired. The classification was performed as follows.

<Evaluation Standard>

A: transmittance is less than 50%

B: transmittance is equal to or greater than 50%

(3) Heat Insulating Properties (Coefficient of Overall Heat Transmission)

Reflection spectra of heat insulating window glass materials prepared in Examples and Comparative Examples were measured in a wavelength range of 5 μm to 25 μm by using a near infrared spectroscope IFS66v/S (manufactured by Bruker Optics K.K.). The coefficient of overall heat transmission was calculated based on JIS A 5759. The reflectivity at a wavelength of 25 μm to 50 μm was extrapolated from the reflectivity at 25 μm based on JIS A 5759.

<Evaluation Standard>

AAA: less than 5.0 W/m$^2$·K

AA: equal to or greater than 5.0 W/m$^2$·K and less than 5.5 W/m$^2$·K

A: equal to or greater than 5.5 W/m$^2$·K and less than 5.9 W/m$^2$·K

B: equal to or greater than 5.9 W/m$^2$·K (4) Light Resistance

Irradiation was performed by using SUNSHINE WEATHER METER S80 manufactured by Suga Test Instruments Co., Ltd. for 1000 hours under the conditions of 225 W/m², a black panel temperature of 63° C., and relative humidity of 50%. Carbon arc light is emitted from the glass side of the heat insulating window glass materials of Examples and Comparative Examples used for bonding the heat insulating window film of Examples and Comparative Examples. A coefficient of overall heat transmission after carbon arc irradiation of the heat insulating window glass materials of Examples and Comparative Examples was measured.

<Evaluation Standard>

AA: difference between the coefficient of overall heat transmission before irradiation and the coefficient of overall heat transmission after irradiation is less than 0.1 W/m²·K A: difference between the coefficient of overall heat transmission before irradiation and the coefficient of overall heat transmission after irradiation is equal to or greater than 0.1 W/m²·K and less than 0.5 W/m²·K B: difference between the coefficient of overall heat transmission before irradiation and the coefficient of overall heat transmission after irradiation is equal to or greater than 0.5 W/m²·K (5) Manufacturing Suitability A: the heat insulating window film can be manufactured by coating B: the heat insulating window film cannot be manufactured by coating Measurement results or evaluation results are shown in the following Table 1.

TABLE 1

| | Fibrous conductive particles-containing layer | | | | | Evaluation of heat insulating window glass | | | | |
|---|---|---|---|---|---|---|---|---|---|---|
| | Presence or absence of fibrous conductive particles-containing layer | Position of fibrous conductive particles-containing layer | Distance between fibrous conductive particles-containing layer and outermost surface on indoor side (μm) | Content per unit area of fibrous conductive particle (g/m²) | Average long axis length of fibrous conductive particles (μm) | Near infrared shielding material (composition) | Visible light transmittance (%) | Near infrared ray shielding properties (average value of transmittance at wavelength of 900 to 1100 nm) | Heat insulating properties (coefficient of overall heat transmission) | Light resistance | Evaluation of heat insulating window film Manufacturing suitability |
| Example 1 | Present | Outermost layer on indoor side | 0 | 0.04 | 34.2 | Present (silver plate-shaped particles) | 85 | A | AAA | AA | A |
| Example 2 | Present | Outermost layer on indoor side | 0 | 0.02 | 34.2 | Present (silver plate-shaped particles) | 86 | A | AA | AA | A |
| Example 3 | Present | Outermost layer on indoor side | 0 | 0.08 | 34.2 | Present (silver plate-shaped particles) | 83 | A | AA | AA | A |
| Example 4 | Present | Outermost layer on indoor side | 0 | 0.16 | 34.2 | Present (silver plate-shaped particles) | 80 | A | AAA | AA | A |
| Example 5 | Present | Outermost layer on indoor side | 0 | 0.24 | 34.2 | Present (silver plate-shaped particles) | 78 | A | AAA | AA | A |
| Example 6 | Present | Second outermost layer on indoor side | 0.5 | 0.04 | 34.2 | Present (silver plate-shaped particles) | 84 | A | AA | AA | A |
| Example 7 | Present | Second outermost layer on indoor side | 0.8 | 0.04 | 34.2 | Present (silver plate-shaped particles) | 85 | A | AA | AA | A |
| Example 8 | Present | Second outermost layer on indoor side | 1.2 | 0.04 | 34.2 | Present (silver plate-shaped particles) | 83 | A | A | AA | A |

TABLE 1-continued

| | Fibrous conductive particles-containing layer | | | | | Evaluation of heat insulating window glass | | | | |
| --- | --- | --- | --- | --- | --- | --- | --- | --- | --- | --- |
| | Presence or absence of fibrous conductive particles-containing layer | Position of fribrous conductive particles-containing layer | Distance between fibrous conductive particles-containing layer and outermost surface on indoor side (μm) | Content per unit area of fibrous conductive particle (g/m²) | Average long axis length of fibrous conductive particles (μm) | Near infrared shielding material (composition) | Visible light transmittance (%) | Near infrared ray shielding properties (average value of transmittance at wavelength of 900 to 1100 nm) | Heat insulating properties (coefficient of overall heat transmission) | Light resistance | Evaluation of heat insulating window film Manufacturing suitability |
| Example 9 | Present | Outermost layer on indoor side | 0 | 0.04 | 4.8 | Present (silver plate-shaped particles) | 82 | A | AA | AA | A |
| Example 10 | Present | Outermost layer on indoor side | 0 | 0.04 | 55 | Present (silver plate-shaped particles) | 80 | A | AAA | AA | A |
| Example 11 | Present | Outermost layer on indoor side | 0 | 0.04 | 34.2 | Present (silver plate-shaped particles) | 84 | A | AAA | AA | A |
| Comparative Example 1 | Present | Outermost layer on indoor side | 0 | 0.04 | 34.2 | None | 88 | B | AAA | B | A |
| Comparative Example 2 | Absent | — | — | — | — | Present (silver plate-shaped particles) | 86 | A | B | — | A |
| Comparative Example 3 | Absent | — | — | — | — | None | 77 | B | AAA | A | B |
| Comparative Example 4 | Present | On surface of support on glass (window) side | 75.6 | 0.04 | 34.2 | Present (silver plate-shaped particles) | 85 | A | B | — | A |

Since the heat insulating window glass of the invention using the heat insulating window film of the invention can be manufactured by a coating method, it was found the manufacturing cost is low, the large area is easily achieved, and visible light transmittance, shielding properties for near infrared light, heat insulating properties, and light resistance are excellent.

Meanwhile, it was found that the heat insulating window glass material using the heat insulating window film of the Comparative Example 1 without providing the near infrared shielding layer has poor shielding properties for near infrared light and light resistance.

It was found that the heat insulating window glass material using the heat insulating window film of the Comparative Example 2 without providing the fibrous conductive particles-containing layer has poor heat insulating properties.

It was found that the heat insulating window glass material using the heat insulating window film of the Comparative Example 3 using the metal multilayer film provided by sputtering as a heat insulating properties, instead of the fibrous conductive particles-containing layer, has poor shielding properties for near infrared light and light resistance. In addition, since the heat insulating window glass material using the heat insulating window film of the Comparative Example 3 is manufactured by a method of providing the metal multilayer film by sputtering, manufacturing cost was high and it was difficult to have a large area.

It was found that, in a case of the heat insulating window glass using the heat insulating window film of the Comparative Example 4 in which the fibrous conductive particles-containing layer is disposed on the surface of the support on a side opposite to the surface of the glass (window) side, that is, in a case where the fibrous conductive particles-containing layer is between the support and the glass (window), poor heat insulating properties are obtained.

When the heat insulating window film of Example 1 was bonded to a window of a building material, the consumption of an air conditioner was averagely decreased by 10% during the winter, compared to a case where the heat insulating window film was not used.

In addition, when the heat insulating window film of Example 1 was bonded to a window of a car, the consumption of an air conditioner was averagely decreased by 15% during the winter.

The heat insulating window glass of the invention using the heat insulating window film of the invention has excellent visible light transmittance, shielding properties for near infrared light, heat insulating properties, and light resistance, and accordingly, when the heat insulating window film of the invention is disposed on the inner side of the window, it is possible to provide excellent visible light transmittance, shielding properties for near infrared light, heat insulating properties, and light resistance. When the heat insulating window film of the invention is used as a building material, it is possible to provide a building or a vehicle containing windows having excellent visible light transmittance, shielding properties for near infrared light, heat insulating properties, and light resistance. The building provided with such windows can allow light on the outdoor side of the window to emit the indoor side thereof and can prevent an increase in temperature on the indoor side due to light irradiation from the outdoor side of the window. Even in a case where light on the outdoor side of the window emits the indoor side over a long time, it is possible to prevent heat exchange from the indoor side to the outdoor side. Accordingly, the indoor side (the inside of a room or the inside of a car) of a building or a vehicle provided with such windows can be maintained in a desired environment.

Even when the heat insulating window film of the invention is bonded to the inside of a well-known window (for example, window of a building or a vehicle), it is possible to provide a window having excellent visible light transmittance, shielding properties for near infrared light, heat insulating properties, and light resistance.

EXPLANATION OF REFERENCES

10: support
20: fibrous conductive particles-containing layer
21: protective layer
31: first adhesive layer
32: second adhesive layer
41: near infrared shielding layer
51: pressure sensitive adhesive layer
61: glass
71: titanium oxide layer
72: silver layer
73: titanium oxide layer
101: adhesive layer-attached support
102: heat insulating member
103: heat insulating window film
111: heat insulating window glass
IN: indoor side
OUT: outdoor side

What is claimed is:

1. A heat insulating window film disposed on the inside of a window, comprising at least:
   a support; and
   a fibrous conductive particles-containing layer disposed on the support,
   wherein:
   the fibrous conductive particles-containing layer is disposed on a surface of the support on a side opposite to the surface of the window side,
   the heat insulating window film contains a near infrared shielding material, and
   an average long axis length of the fibrous conductive particles contained in the fibrous conductive particles-containing layer is from 5 to 50 µm.

2. The heat insulating window film according to claim 1, wherein a content per unit area of the fibrous conductive particles of the fibrous conductive particles-containing layer is from 0.02 to 0.2 $g/m^2$.

3. The heat insulating window film according to claim 1, wherein a distance between the fibrous conductive particles-containing layer of the heat insulating window film and an outermost surface on the indoor side is within 1 µm.

4. The heat insulating window film according to claim 2, wherein a distance between the fibrous conductive particles-containing layer of the heat insulating window film and an outermost surface on the indoor side is within 1 µm.

5. The heat insulating window film according to claim 1, wherein the fibrous conductive particles-containing layer of the heat insulating window film is the outermost surface or the second outermost layer on the indoor side.

6. The heat insulating window film according to claim 2, wherein the fibrous conductive particles-containing layer of the heat insulating window film is the outermost surface or the second outermost layer on the indoor side.

7. The heat insulating window film according to claim 1, wherein visible light transmittance in a case where the heat insulating window film is bonded to a blue plate glass having a thickness of 3 mm is equal to or greater than 80%.

8. The heat insulating window film according to claim 1, wherein the fibrous conductive particles-containing layer further contains a sol-gel hardened material obtained by hydrolysis and polycondensation of an alkoxide compound of an element (b) selected from the group consisting of Si, Ti, Zr, and Al.

9. The heat insulating window film according to claim 2, wherein the fibrous conductive particles-containing layer further contains a sol-gel hardened material obtained by hydrolysis and polycondensation of an alkoxide compound of an element (b) selected from the group consisting of Si, Ti, Zr, and Al.

10. The heat insulating window film according to claim 8, wherein a ratio of the mass of the alkoxide compound used for forming the sol-gel hardened material in the fibrous conductive particles-containing layer and the mass of fibrous conductive particles contained in the fibrous conductive particles-containing layer is from 0.25/1 to 30/1.

11. A heat insulating window glass in which the heat insulating window film according to claim 1 and a glass are laminated.

12. A building material comprising:
the heat insulating window film according to claim 1.

13. A window comprising:
a transparent window support; and
the heat insulating window film according to claim 1 bonded to the transparent window support.

14. A building comprising:
the heat insulating window film according to claim 1.

15. A vehicle comprising:
the heat insulating window film according to claim 1.

* * * * *